(12) United States Patent
Paul

(10) Patent No.: US 9,664,139 B2
(45) Date of Patent: May 30, 2017

(54) CAPTIVE OXYGEN FUEL REACTOR

(71) Applicant: Buddy Ray Paul, Griffin, GA (US)

(72) Inventor: Buddy Ray Paul, Griffin, GA (US)

( * ) Notice: Subject to any disclaimer, the term of this patent is extended or adjusted under 35 U.S.C. 154(b) by 0 days.

(21) Appl. No.: 15/205,721

(22) Filed: Jul. 8, 2016

(65) Prior Publication Data

US 2017/0009702 A1    Jan. 12, 2017

Related U.S. Application Data

(60) Provisional application No. 62/190,052, filed on Jul. 8, 2015.

(51) Int. Cl.
| | |
|---|---|
| *F02D 25/00* | (2006.01) |
| *F02D 29/06* | (2006.01) |
| *F02G 3/02* | (2006.01) |
| *H02K 7/18* | (2006.01) |
| *F02B 3/00* | (2006.01) |

(52) U.S. Cl.
CPC .............. *F02G 3/02* (2013.01); *H02K 7/1815* (2013.01); *F02G 2250/00* (2013.01); *F02G 2254/10* (2013.01); *F02G 2254/20* (2013.01); *F02G 2270/10* (2013.01); *F02G 2270/80* (2013.01); *F02G 2280/20* (2013.01); *F02G 2280/50* (2013.01); *F02G 2290/00* (2013.01)

(58) Field of Classification Search
USPC ........................................... 290/4 A; 123/299
See application file for complete search history.

(56) References Cited

U.S. PATENT DOCUMENTS

| | | | |
|---|---|---|---|
| 9,038,595 B2* | 5/2015 | Paul ......................... | F02D 19/02 123/1 A |
| 2012/0255518 A1* | 10/2012 | Paul ......................... | F02D 19/02 123/299 |

* cited by examiner

*Primary Examiner* — Pedro J Cuevas

(57) ABSTRACT

A system of captive oxygen fuel reactor to efficiently generate electricity from hydrocarbon fuel utilizes a flow of oxygen and a flow of hydrogen from an electrolysis unit and a flow of carbon monoxide in order to complete a fuel oxidizer reaction within a heat exchanger unit. The fuel oxidizer reaction emits a flow of steam and a flow of carbon dioxide from the heat exchanger unit re-direct them through a steam rotary piston motor unit, a carbon dioxide rotary piston motor unit, a steam carousel motor unit, a carbon dioxide carousel motor unit, and a duel drum motor unit to generate electrical current. The exhaust gases within the system are properly discharged and stored within respective storage containers for the use of the system or other possible requirements.

13 Claims, 23 Drawing Sheets

CAPTIVE OXYGEN FUEL REACTOR

The current application claims a priority to the U.S. Provisional Patent application Ser. No. 62/190,052 filed on Jul. 8, 2015.

FIELD OF THE INVENTION

The present invention relates generally to an apparatus to generate electricity efficiently from hydrocarbon fuels and control pollution emissions. The present invention may be used as an assembly, individually or grouped to fit the needs of the hydrocarbon fuel of choice. Generated commodity products include electricity, heat, mechanical force, water, oxygen, hydrogen, nitrogen, carbon dioxide, and other elements within selected hydrocarbon fuels and atmosphere.

BACKGROUND OF THE INVENTION

The capital cost of electrical energy production coupled with the increasing cost of fuel and the impact on the environment with conventional power generation from hydrocarbon fuels have made the present invention a valuable commodity. The present invention can enhance the quantity of electrical power generated from a given amount of fuel and improve the atmospheric condition. Efficient production of electricity is accomplished with the controlled reaction chamber metering fuel and oxygen, environmental containment and revolutionary mechanical devices. By products of fuel combustion such as water, and other elements and compounds are captured, stored and utilized as required. Multi arrays of different geometric shapes maximize electrical production while employing different pressurized and temperature containments. The electrical current generated passes through an electrolyzer producing additional hydrogen and oxygen. The generated current may be consumed, sent to the grid, or stored in hydrogen for future peak use or sold as a hydrogen commodity. Further uses of stored energy in hydrogen may be used in Fuel-cell electrical generation or routed to the reactor to increase operating temperature to immediately satisfy peak load demand. Controller programs controls and activates all electrical functions as required.

DETAIL DESCRIPTIONS OF THE INVENTION

Figure 1:
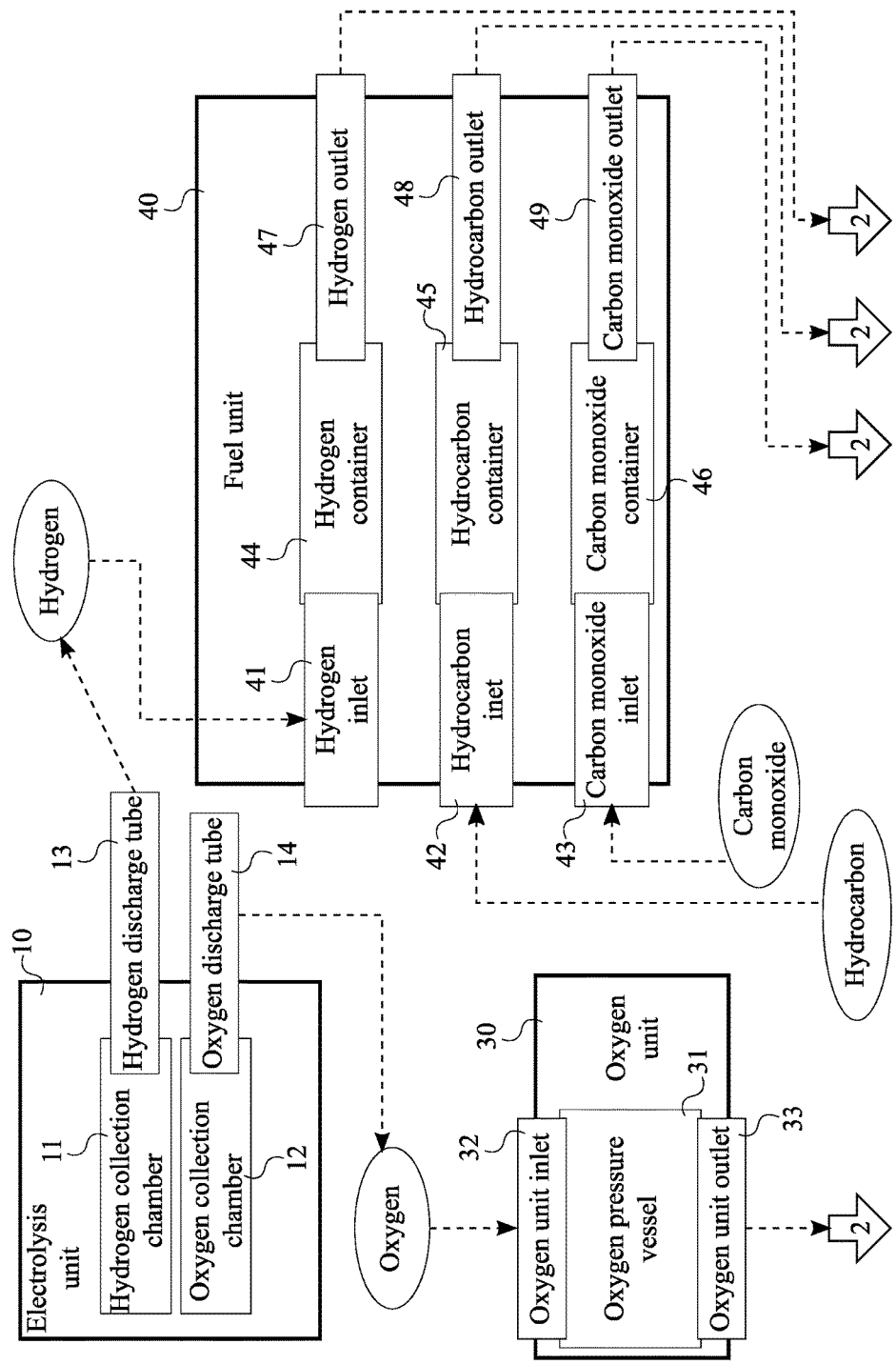
FIG. 1 is a basic flow chart illustrating the electrolysis unit, the oxygen unit, and the fuel unit within the overall system of the present invention.
Figure 2:
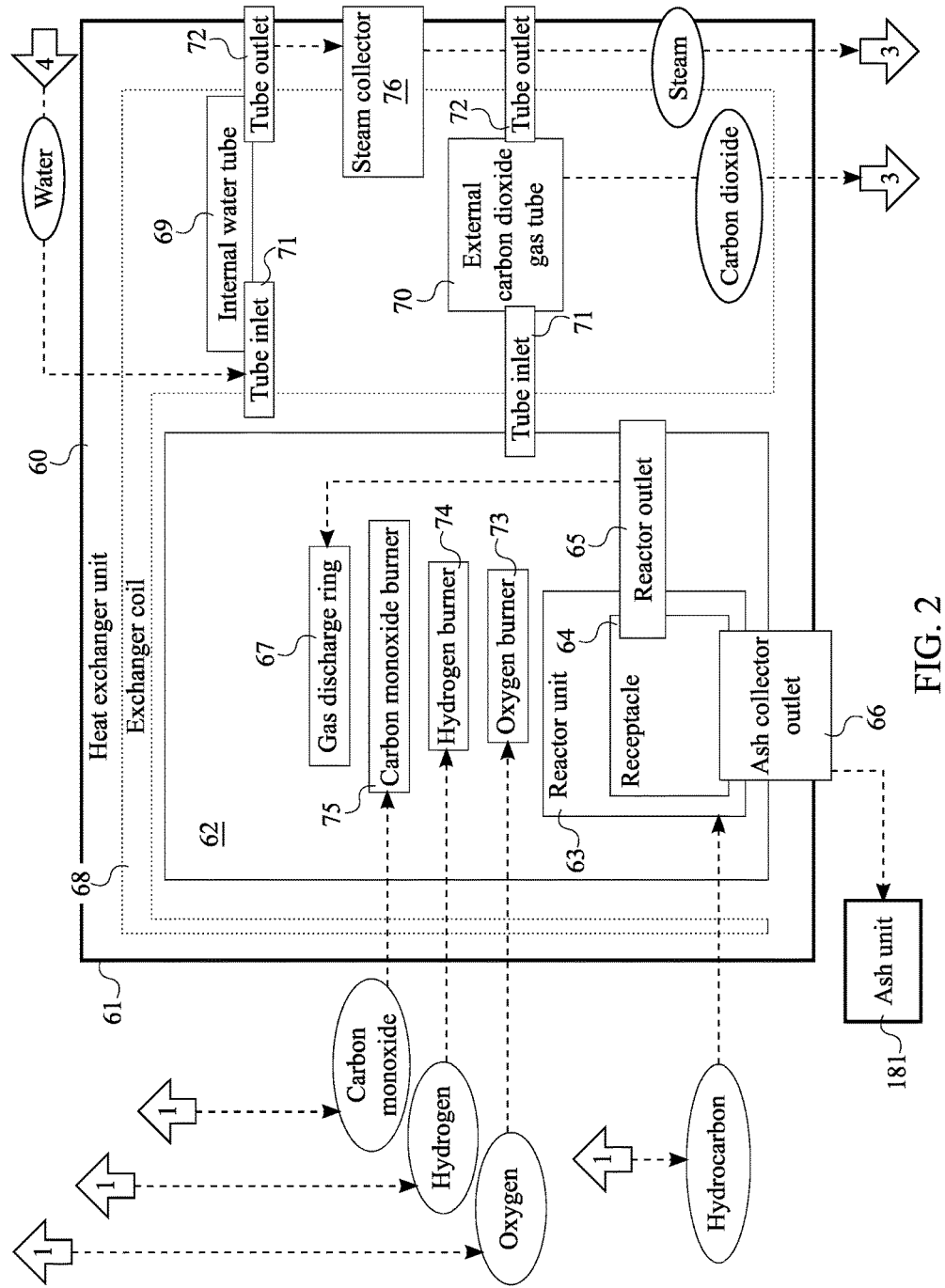
FIG. 2 is a basic flow chart illustrating the heat exchanger unit within the overall system of the present invention.
Figure 3:
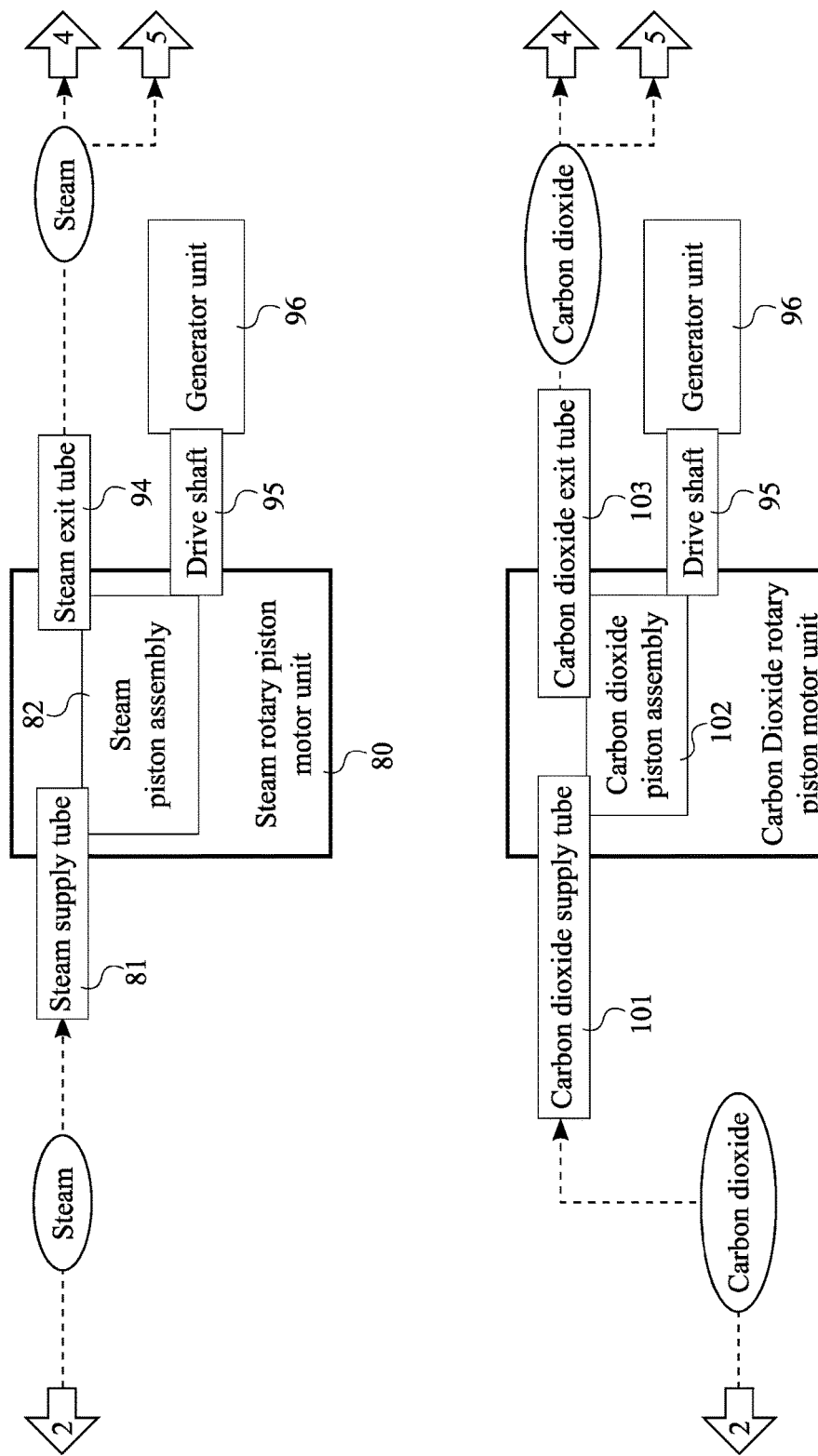
FIG. 3 is a basic flow chart illustrating the steam rotary piston motor unit and the carbon dioxide rotary piston motor unit within the overall system of the present invention.
Figure 4:
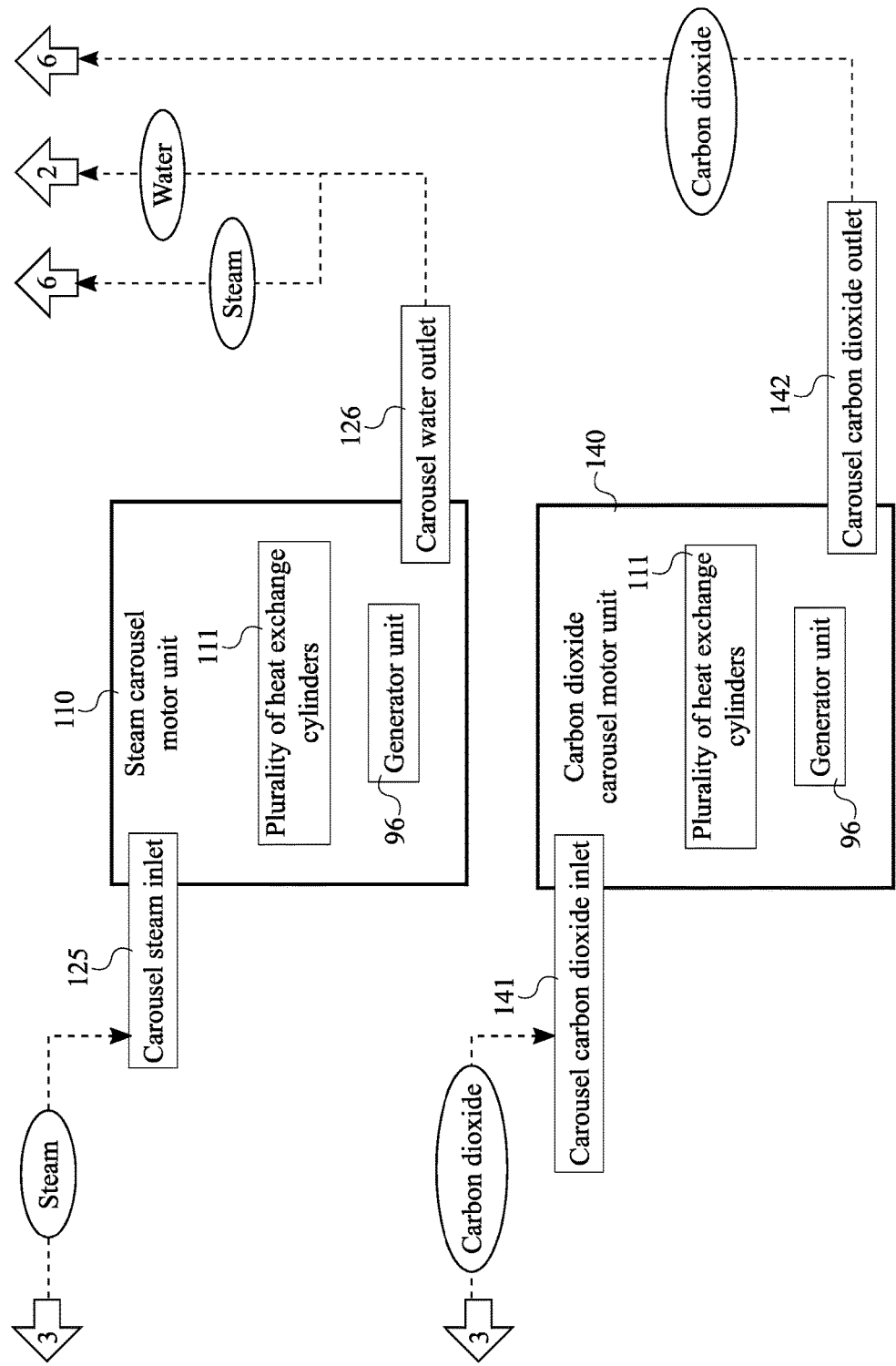
FIG. 4 is a basic flow chart illustrating the steam carousel motor unit and the carbon dioxide carousel motor unit within the overall system of the present invention.
Figure 5:
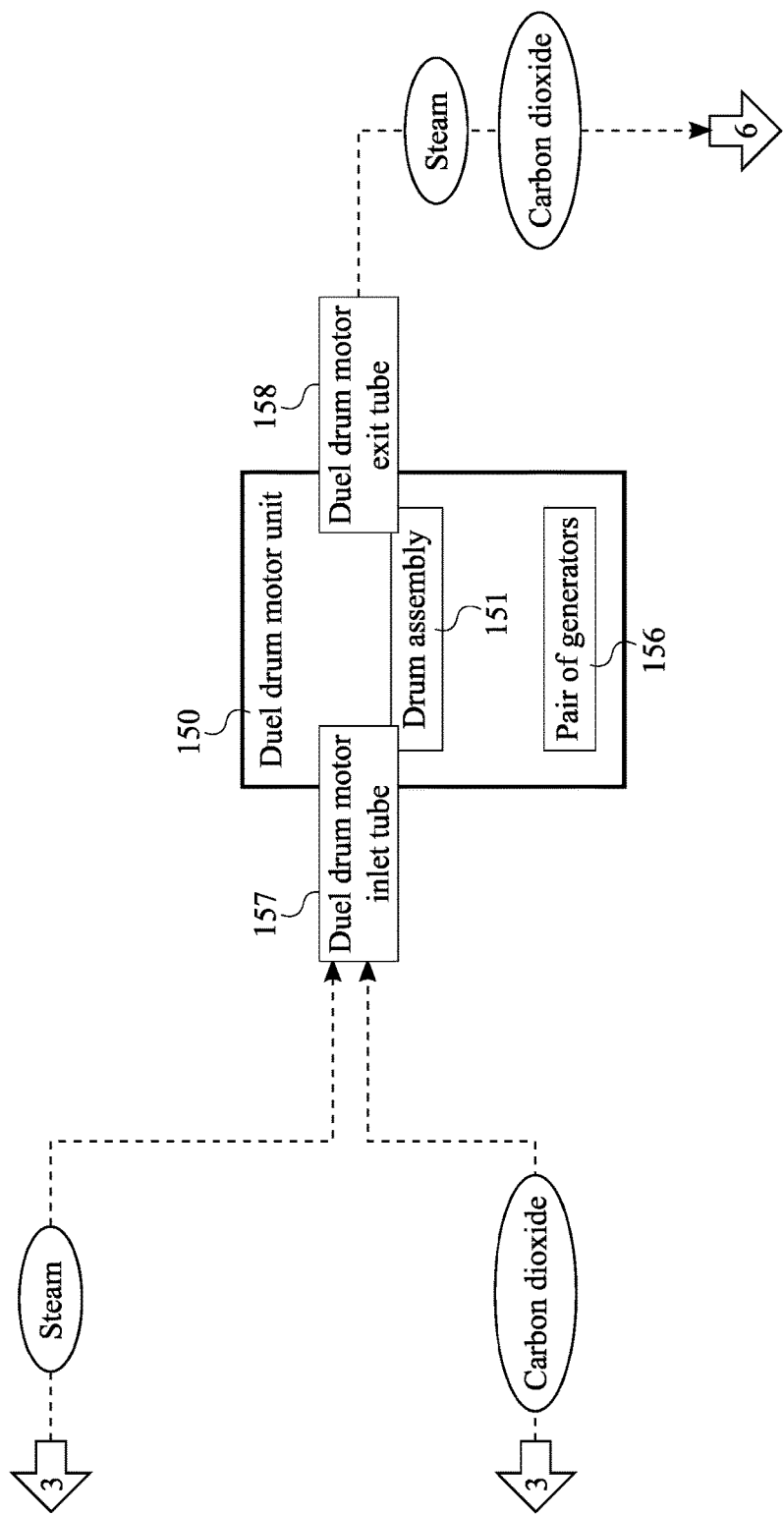
FIG. 5 is a basic flow chart illustrating the duel drum motor unit within the overall system of the present invention.

All illustrations of the drawings are for the purpose of describing selected versions of the present invention and are not intended to limit the scope of the present invention.

The present invention is a captive oxygen fuel reactor to efficiently generate electricity from hydrocarbon fuel. The present invention comprises an electrolysis unit 10, an oxygen unit 30, a fuel unit 40, a heat exchanger unit 60, a steam rotary piston motor unit 80, a carbon dioxide rotary piston motor unit 100, a duel drum motor unit 150, and a compressor unit 160 as shown in FIG. 1-7. In reference to the general configuration of the present invention, the electrolysis unit 10 is in series fluid communication with the oxygen unit 30 and the fuel unit 40 so that electrolysis unit 10 is able to supply a flow of oxygen to the oxygen unit 30 and a flow of hydrogen to the fuel unit 40. The fuel unit 40 and the oxygen unit 30 are collectively in fluid communication with the heat exchanger unit 60. As a result, the heat exchanger unit 60 is able to collect the flow of oxygen from the oxygen unit 30. Simultaneously, the heat exchanger unit 60 is also able to collect the flow of hydrogen, a flow of carbon monoxide, a flow of hydrocarbon from the fuel unit 40, wherein the flow of carbon monoxide and the flow of hydrocarbon are supplied to the fuel unit 40 from respective external sources. A fuel oxidizer reaction that takes place with the heat exchanger unit 60 converts the flow oxygen, the flow of hydrogen, the flow of carbon monoxide, and the flow of hydrocarbon into a flow of steam and a flow of carbon dioxide. The heat exchanger unit 60 is in fluid communication with the steam rotary piston motor unit 80 and the carbon dioxide rotary piston motor unit 100. More specifically, the steam rotary piston motor unit 80 and the carbon dioxide rotary piston motor unit 100 generate electrical current through the flow of steam and the flow of carbon monoxide. The steam rotary piston motor unit 80 is in series in fluid communication with the steam carousel motor unit 110 and the duel drum motor unit 150. As a result, the steam carousel motor unit 110 and the duel drum motor unit 150 are also able to generate electrical current with the flow of steam. Similarly, the carbon dioxide rotary piston motor unit 100 is in series in fluid communication with the carbon dioxide carousel motor unit 140 and the duel drum motor unit 150 to generate electrical current with the flow of carbon dioxide. The steam carousel motor unit 110, the carbon dioxide carousel motor unit 140, and the duel drum motor unit 150 are in fluid communication with the compressor unit 160 so that exhaust gases of the present invention can be separated and stored within the respective storage containers.

Figure 8:
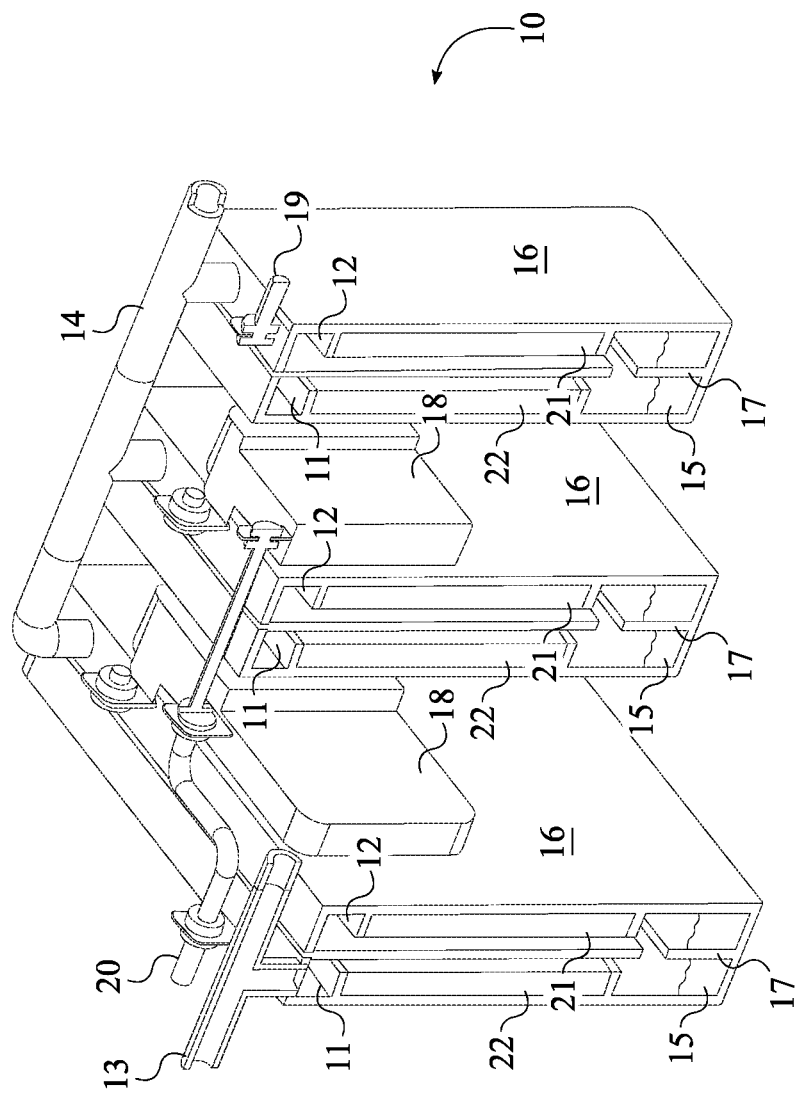
FIG. 8 is a perspective section view of the electrolysis unit of the present invention.

The electrolysis unit 10 houses a body of water and produces the flow oxygen and the flow of hydrogen through the use of electrical current. In reference to FIG. 1 and FIG. 8, the electrolysis unit 10 comprises a body of electrolyte 15, an electrode case 16, a separator 17, a capacitor 18, a positive lead 19, a negative lead 20, a positive electrode 21, a negative electrode 22, a hydrogen collection chamber 11, an oxygen collection chamber 12, a hydrogen discharge tube 13, and an oxygen discharge tube 14. More specifically, the separator 17 divides the electrode case 16 into two halves so that the body of electrolyte 15, which is the body of water, can be separated within the electrode case 16. The positive lead 19 is electrically connected with the positive electrode 21 that is positioned within the electrode case 16. Similarly, the negative lead 20 is electrically connected with the negative electrode 22 that is positioned within the electrode case 16. The capacitor 18 is positioned external to the electrode case 16. The capacitor 18 is electrically charged and allows for an increased current flow with a reduced total voltage supply. When an electrical current is applied to the positive electrode 21 through the positive lead 19 and the negative electrode 22 through the negative lead 20, positive current breaks down the body of water producing the flow of oxygen. Then, the flow of oxygen is stored within the oxygen collection chamber 12. When an electrical current is applied to the positive electrode 21 through the positive lead 19 and the negative electrode 22 through the negative lead 20, negative current breaks down the body of water producing the flow of hydrogen. Then, the flow of hydrogen is stored within the hydrogen collection chamber 11. In reference to FIG. 1, the oxygen discharge tube 14 is in fluid communication with the oxygen collection chamber 12 in order to supply the flow of oxygen from the electrolysis unit 10 to the oxygen unit 30. The hydrogen discharge tube 13 is in fluid communication with the hydrogen collection chamber 11 in order to supply the flow of hydrogen from the electrolysis unit 10 to the fuel unit 40.

Figure 9:
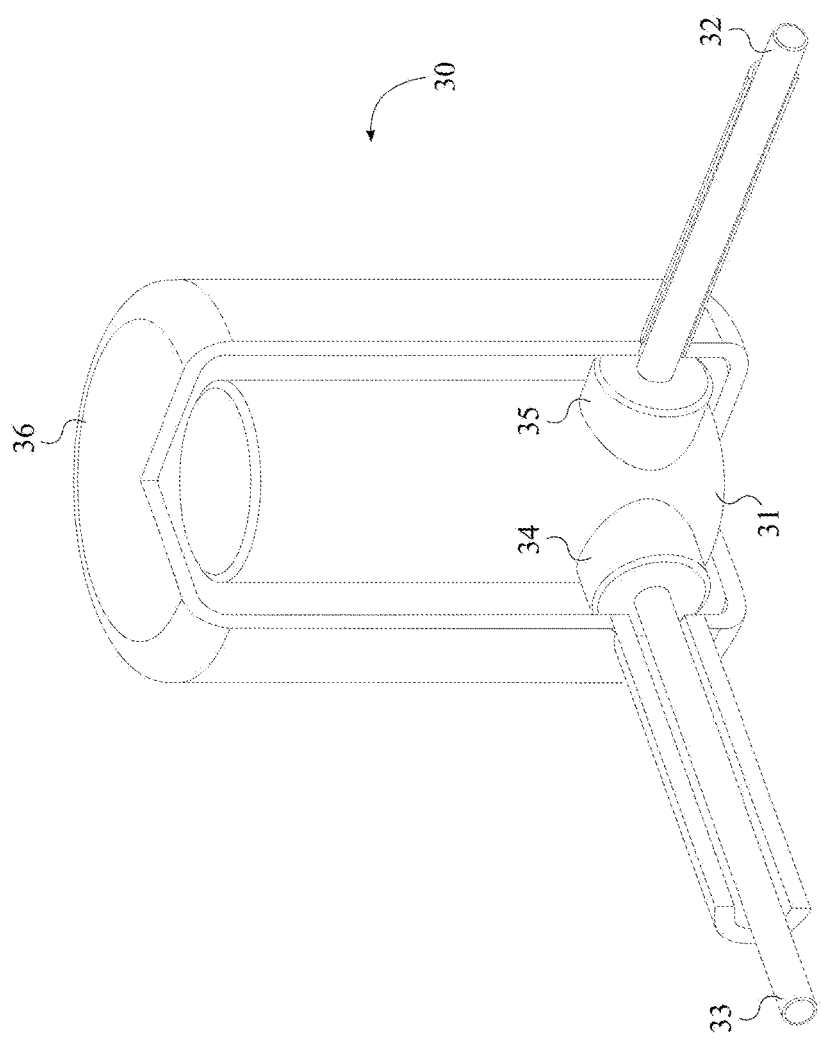
FIG. 9 is a perspective section view of the oxygen unit of the present invention.

The oxygen unit 30 regulates the flow of oxygen within the present invention before the flow of oxygen is discharged to the fuel unit 40. In reference to FIG. 1 and FIG. 9, the oxygen unit 30 comprises an oxygen pressure vessel 31, an oxygen unit inlet 32, an oxygen unit outlet 33, an oxygen discharge regulator 34, an oxygen storage regulator 35, and a casing 36. More specifically, the oxygen unit inlet 32 is in fluid communication with the oxygen pressure vessel 31 through the oxygen storage regulator 35. Similarly, the oxygen unit outlet 33 is in fluid communication with the oxygen pressure vessel 31 through the oxygen discharge regulator 34. The casing 36 encloses the oxygen pressure vessel 31, the oxygen storage regulator 35, and the oxygen discharge regulator 34 to provide environmental protection while allowing the oxygen unit inlet 32 and the oxygen unit outlet 33 to traverse through the casing 36. In reference to FIG. 1, the oxygen unit inlet 32 is in fluid communication with the oxygen discharge tube 14 of the electrolysis unit 10. As a result, the flow of oxygen from the oxygen collection chamber 12 can be discharged to the oxygen pressure vessel 31 via the oxygen unit inlet 32 and the oxygen storage regulator 35. Furthermore, the oxygen unit outlet 33 is in fluid communication with the heat exchanger unit 60 in order to supply the flow of oxygen from the oxygen pressure vessel 31 to the heat exchanger unit 60.

Figure 10:
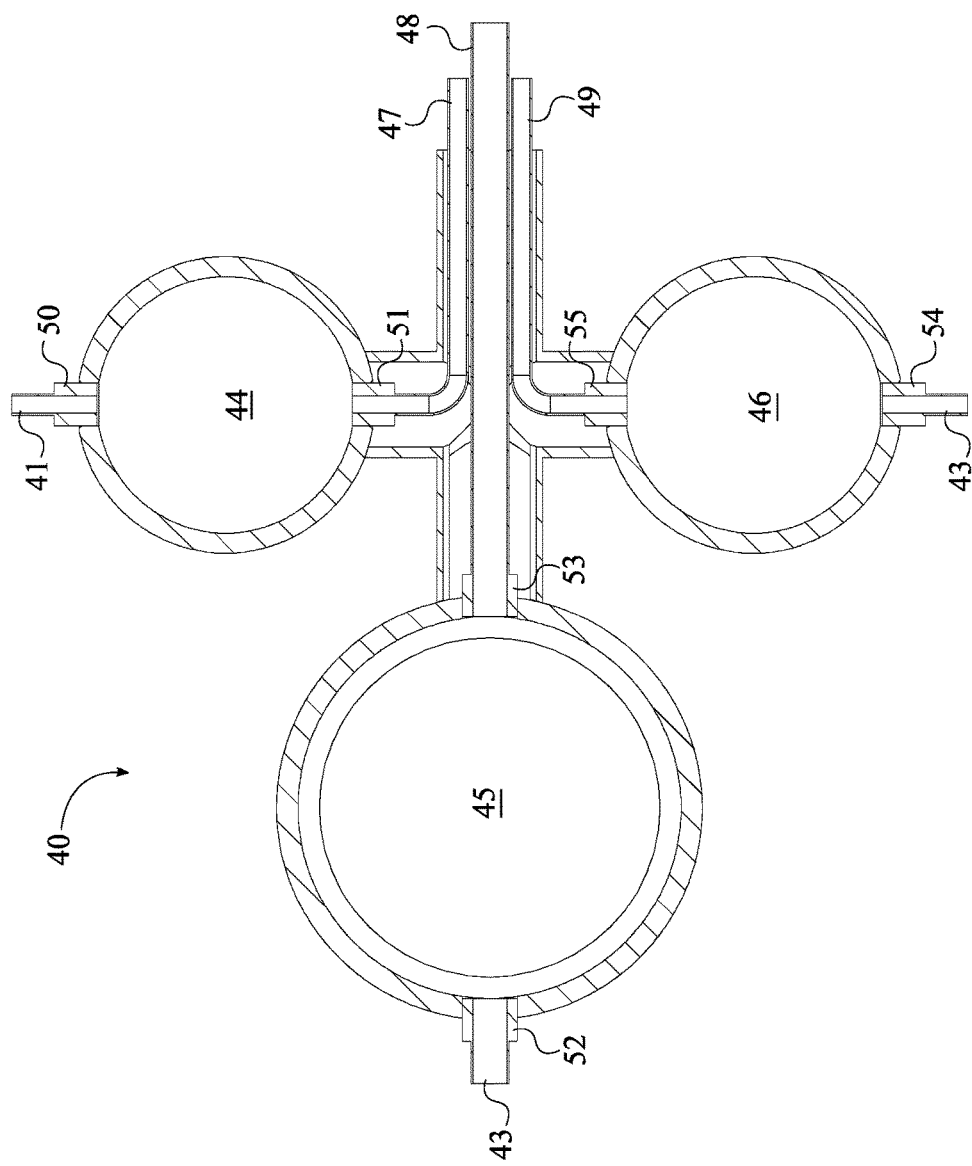
FIG. 10 is a top section view of the fuel unit of the present invention.

The fuel unit 40 collects all of the necessary fuel compounds and re-directs said components into the heat exchanger unit 60, other than the flow of oxygen. In reference to FIG. 1 and FIG. 10, the fuel unit 40 comprises a hydrogen inlet 41, a hydrocarbon inlet 42, a carbon monoxide inlet 43, a hydrogen container 44, a hydrocarbon container 45, a carbon monoxide container 46, a hydrogen outlet 47, a hydrocarbon outlet 48, a carbon monoxide outlet 49, a hydrogen storage regulator 50, a hydrogen discharge regulator 51, a hydrocarbon storage regulator 52, a hydrocarbon discharge regulator 53, a carbon monoxide storage regulator 54, and a carbon monoxide discharge regulator 55. More specifically, the hydrogen inlet 41 and the hydrogen outlet 47 are in fluid communication with the hydrogen container 44 through the hydrogen storage regulator 50 and the hydrogen discharge regulator 51 respectively. The hydrogen inlet 41 is in fluid communication with the hydrogen discharge tube 13 in order to collect the flow of hydrogen from the electrolysis unit 10. When the flow of hydrogen is discharged from the electrolysis unit 10, the flow of hydrogen is collected and stored with the hydrogen container 44 as shown in FIG. 1. Additionally, the hydrocarbon inlet 42 and the hydrocarbon outlet 48 are in fluid communication with the hydrocarbon container 45 through the hydrocarbon storage regulator 52 and the hydrocarbon discharge regulator 53 respectively. The hydrocarbon inlet 42 is in fluid communication with an external source of hydrocarbon, wherein the external source of hydrocarbon supplies a body of hydrocarbon to the present invention. When the body of hydrocarbon is discharged from the external source of hydrocarbon, the body of hydrocarbon is collected and stored with the hydrocarbon container 45 as shown in FIG. 1. Additionally, the carbon monoxide inlet 43 and the carbon monoxide outlet 49 are in fluid communication with the carbon monoxide container 46 through the carbon monoxide storage regulator 54 and the carbon monoxide discharge regulator 55 respectively. The carbon monoxide inlet 43 is in fluid communication with an external source of carbon monoxide, wherein the external source of carbon monoxide supplies a flow of carbon monoxide to the present invention. When the flow of carbon monoxide is discharged from the external source of carbon monoxide, the flow of carbon monoxide is collected and stored with the carbon monoxide container 46 as shown in FIG. 1. Furthermore, the hydrogen outlet 47 is in fluid communication with the heat exchanger unit 60 in order to supply the flow of hydrogen from the hydrogen container 44 to the heat exchanger unit 60. The hydrocarbon outlet 48 is in fluid communication with the heat exchanger unit 60 in order to supply the body of hydrocarbon from the hydrocarbon container 45 to the heat exchanger unit 60. The carbon monoxide outlet 49 is in fluid communication with the heat exchanger unit 60 in order to supply the flow of carbon monoxide from the carbon monoxide container 46 to the heat exchanger unit 60.

Figure 11:
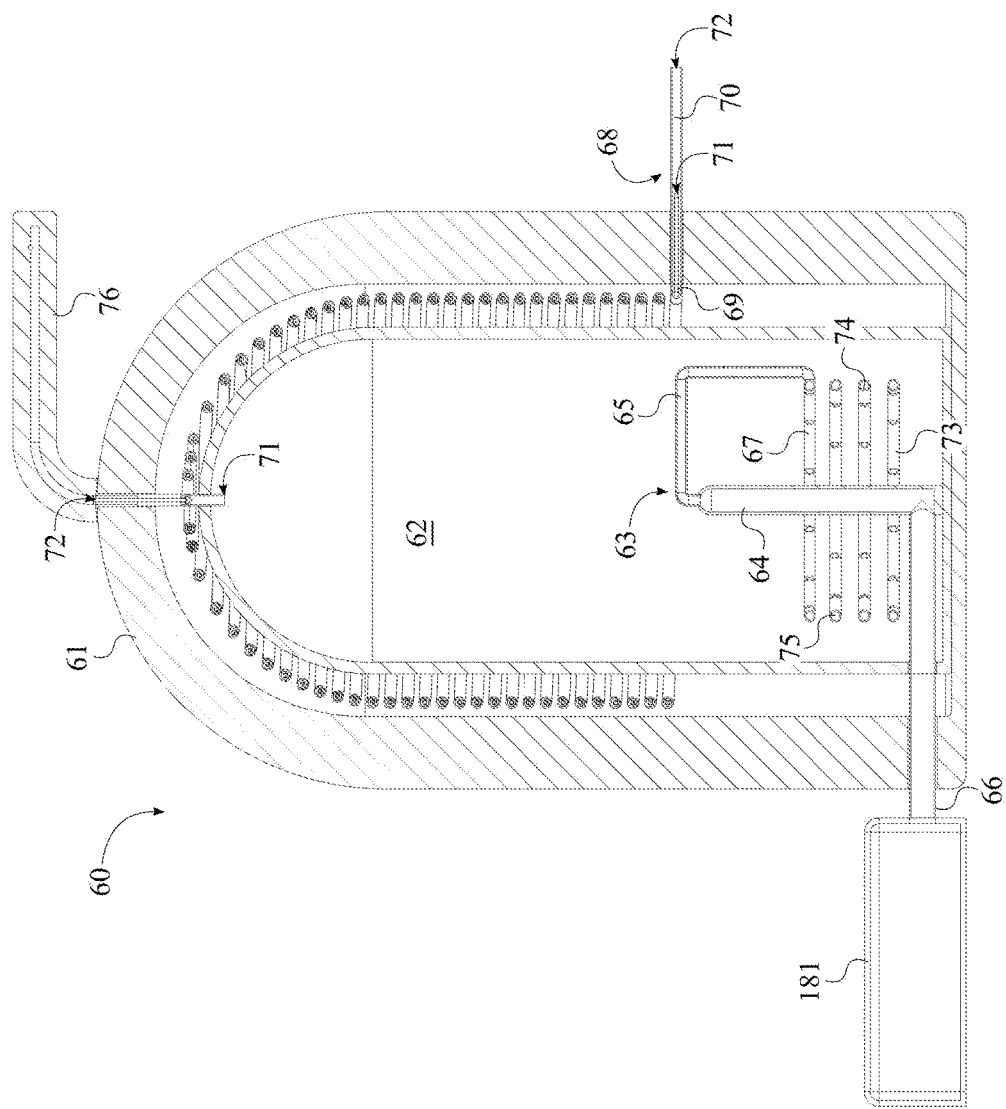
FIG. 11 is a side section view of the heat exchanger unit of the present invention.

The heat exchanger unit 60 completes the fuel oxidizer reaction within the present invention. In reference to FIG. 2 and FIG. 11, the heat exchanger unit 60 comprises a reactor structure unit 61, a reactor chamber 62, a reactor unit 63, an exchanger coil 68, an oxygen burner 73, a hydrogen burner 74, a carbon monoxide burner 75, and a steam collector 76. More specifically, the reactor unit 63, the oxygen burner 73, the hydrogen burner 74, and the carbon monoxide burner 75 are internally mounted within the reactor chamber 62. The reactor chamber 62 is enclosed by the reactor structure unit 61 forming a radial space in between the reactor chamber 62 and the reactor structure unit 61 so that the exchanger coil 68 is positioned in between the reactor chamber 62 and the reactor structure unit 61. In other words, the exchanger coil 68 is positioned within the radial space of the heat exchanger unit 60 so that the exchanger coil 68 can be separated from the reactor chamber 62 in order to maximize the functionality of the exchanger coil 68.

The hydrocarbon outlet 48 traverses into the reactor chamber 62 through the reactor structure unit 61 and is in fluid communication with the reactor unit 63 so that the body of hydrocarbon can be supplied from the hydrocarbon container 45 and deposited within the reactor unit 63. The reactor unit 63 comprises a receptacle 64, a reactor outlet 65, an ash collector outlet 66, and a gas discharge ring 67. The ash collector outlet 66 and the reactor outlet 65 are in fluid communication with the receptacle 64. The reactor outlet 65 is in fluid communication with the gas discharge ring 67. More specifically, the body of hydrocarbon is transformed into a flow of producer gas and a quantity of ash within the receptacle 64 as the body of hydrocarbon is temporarily stored within the receptacle 64. Then, the flow of producer gas is captured by the reactor outlet 65 and supplied to the gas discharge ring 67. As a result, the gas discharge ring 67 is able to release the flow of producer gas into the reactor chamber 62. The quantity of ash is collected by the ash collector outlet 66, which traverses from the reactor chamber 62 through the reactor structure unit 61, in order to deposit the quantity of ash into an ash unit 181 of the present invention that is in fluid communication with the ash collector outlet 66.

The oxygen unit outlet 33 traverses into the reactor chamber 62 through the reactor structure unit 61 and is in fluid communication with the oxygen burner 73. As a result, the flow of oxygen that is supplied from the oxygen pressure vessel 31 can be released into the reactor chamber 62 through the oxygen burner 73.

The hydrogen outlet 47 traverses into the reactor chamber 62 through the reactor structure unit 61 and is in fluid communication with the hydrogen burner 74. As a result, the flow of hydrogen that is supplied from the hydrogen container 44 can be released into the reactor chamber 62 through the hydrogen burner 74.

The carbon monoxide outlet 49 traverses into the reactor chamber 62 through the reactor structure unit 61 and is in fluid communication with the carbon monoxide burner 75. As a result, the flow of carbon monoxide that is supplied from the carbon monoxide container 46 can be released into the reactor chamber 62 through the carbon monoxide burner 75.

When the flow of producer gas, the flow of oxygen, the flow of hydrogen, and the flow of carbon monoxide are released into the reactor chamber 62, the heat exchanger unit 60 is able to complete the fuel oxidizer reaction. More specifically, the flow of producer gas, the flow of oxygen, the flow of hydrogen, and the flow of carbon monoxide react together and transform into a flow of heated carbon dioxide gas compound. The flow of heated carbon dioxide gas compound consists mostly of carbon dioxide with lesser quantities of water, carbon monoxide, and other containments from the body of hydrocarbon.

The exchanger coil 68 that is positioned in between the reactor chamber 62 and the reactor structure unit 61 comprises an internal water tube 69 and an external carbon dioxide gas tube 70. The exchanger coil 68 is positioned external to the reactor chamber 62 so that the exchanger coil 68 is able to efficiently cool down the flow of heated carbon dioxide gas compound within the heat exchanger unit 60. The internal water tube 69 is radially enclosed by the external carbon dioxide gas tube 70. More specifically, a tube inlet 71 of the external carbon dioxide gas tube 70 traverses into the reactor chamber 62 from a top of the reactor structure unit 61. As a result, the tube inlet 71 of the external carbon dioxide gas tube 70 is in fluid communication with the reactor chamber 62 allowing the heated carbon dioxide gas compound to be discharged into the tube inlet 71 of the external carbon dioxide gas tube 70. Then, the heated carbon dioxide gas compound flows through the exchanger coil 68 and exits as a flow of carbon dioxide gas compound through a tube outlet 72 of the external carbon dioxide gas tube 70 that traverses through the reactor structure unit 61. The temperature difference between the heated carbon dioxide gas compound and the flow of carbon dioxide gas compound is accomplished through the thermal conduction that takes place between the internal water tube 69 and the external carbon dioxide gas tube 70. More specifically, a tube inlet 71 of the internal water tube 69 traverses through the reactor structure unit 61, adjacent to the tube outlet 72 of the external carbon dioxide gas tube 70, in order to supply a flow of water. The flow of water travels through the exchanger coil 68 and cools down the heated carbon dioxide gas compound. The flow of water then exits from a tube outlet 72 of the internal water tube 69 that traverses into the reactor structure unit 61, adjacent to the tube inlet 71 of the external carbon dioxide gas tube 70. Due to the thermal conduction, the flow of water absorbs heat and goes through a phase change, thus yielding the flow of steam to be exited through the tube outlet 72 of the internal water tube 69. The steam collector 76 traverses into the reactor structure unit 61 and is in fluid communication with the tube outlet 72 of the internal water tube 69. As a result, the heat exchanger unit 60 is able to collect the flow of steam from the tube outlet 72 of the internal water tube 69.

The steam rotary piston motor unit 80 converts mechanical energy to the electrical energy with the flow of steam. As a result, the steam rotary piston motor unit 80 can produce electrical current within the present invention. In reference to FIG. 3, the steam rotary piston motor unit 80 comprises a steam supply tube 81, a steam piston assembly 82, a steam exit tube 94, a drive shaft 95, and a generator unit 96. More specifically, the steam supply tube 81 and the steam exit tube 94 are in fluid communication with the steam piston assembly 82 providing an input port and output port for the steam rotary piston motor unit 80. The generator unit 96 is operatively coupled with the steam piston assembly 82 by the drive shaft 95, wherein the generator unit 96 is able to convert the mechanical energy of the steam piston assembly 82 into electrical current. Additionally, the steam supply tube 81 is in fluid communication with the steam collector 76 in order to supply the flow of steam from the reactor chamber 62 of the heat exchanger unit 60 to the steam rotary piston motor unit 80. Then, the steam piston assembly 82 unit is able to convert the flow of steam into mechanical energy that provides rotational motive force to the generator unit 96. Since the generator unit 96 is operatively coupled with the steam piston assembly 82, the generator unit 96 converts the mechanical energy into electrical current. Once the flow of steam travels through the steam piston assembly 82, the flow of steam discharges through the steam exit tube 94.

The carbon dioxide rotary piston motor unit 100 functions similar to the steam rotary piston motor unit 80 and converts mechanical energy into the electrical energy from the flow of carbon dioxide gas compound. As a result, the carbon dioxide rotary piston motor unit 100 can produce electrical current within the present invention. In reference to FIG. 3, the carbon dioxide rotary piston motor unit 100 comprises a carbon dioxide supply tube 101, a carbon dioxide piston assembly 102, a carbon dioxide exit tube 103, a drive shaft 95, and a generator unit 96. More specifically, the carbon dioxide supply tube 101 and the carbon dioxide exit tube 103 are in fluid communication with the carbon dioxide piston assembly 102 providing an input port and output port for the carbon dioxide rotary piston motor unit 100. The generator unit 96 is operatively coupled with the carbon dioxide piston assembly 102 by the drive shaft 95, wherein the generator unit 96 is able to convert the mechanical energy of the carbon dioxide piston assembly 102 into electrical current. Additionally, the carbon dioxide supply tube 101 is in fluid communication with the external carbon dioxide gas tube 70 in order to supply the flow of carbon dioxide from the exchanger coil 68 of the heat exchanger unit 60 to the carbon dioxide rotary piston motor unit 100. Then, the carbon dioxide piston assembly 102 unit is able to convert the flow of carbon dioxide into mechanical energy that provides rotational motive force to the generator unit 96. Since the generator unit 96 is operatively coupled with the carbon dioxide piston assembly 102, the generator unit 96 converts the mechanical energy into electrical current. Once the flow of carbon dioxide travels through the carbon dioxide piston assembly 102, the flow of carbon dioxide discharges through the carbon dioxide exit tube 103.

The steam piston assembly 82 and the carbon dioxide piston assembly 102 utilize the same functionality within the present invention. The steam piston assembly 82 and the carbon dioxide piston assembly 102 rotate between multiple degrees of piston rotations so that the flow of steam and the flow of carbon dioxide gas compound are able to actuate the respective piston assembly. In order to define the multiple degrees of piston rotations, the flow of steam and the flow of carbon dioxide gas are described as a flow of low pressure gas and a flow of high pressure gas within the steam piston assembly 82 and the carbon dioxide piston assembly 102. In reference to FIG. 12-16, the steam piston assembly 82 and the carbon dioxide piston assembly 102 each comprise a piston motor case 83, a piston member 84, a piston plunger 85, a piston solenoid 86, a piston exit tube 87, a piston entry tube 88, a piston supply solenoid 89, a piston partition 90, a piston chamber 91, a piston supply plunger 92, and a piston hub 93.

The piston motor case 83 is connected to the generator unit 96 and internally houses the piston member 84, forming the piston chamber 91 in between the piston motor case 83 and the piston member 84. The generator unit 96 is operatively coupled with the piston hub 93 through the drive shaft 95. When the piston member 84 rotates, the piston hub 93 and the drive shaft 95 collectively provides rotational motive force to the generator unit 96 in order to create electrical current. The piston partition 90 is radially extended from the piston member 84 to the piston motor case 83 in order to function as a divider for the piston chamber 91. The piston entry tube 88 traverses into the piston chamber 91 and is in fluid communication with the piston chamber 91 so that the flow of low pressure gas is able to enter into the piston chamber 91. More specifically, the piston entry tube 88 of the steam piston assembly 82 is in fluid communication with the steam supply tube 81 through the piston supply solenoid 89 and the piston supply plunger 92. The piston entry tube 88 of the carbon dioxide piston assembly 102 is in fluid communication with the carbon dioxide supply tube 101 through the piston supply solenoid 89 and the piston supply plunger 92. As a result, the flow of high pressure gas is able to enter into the piston chamber 91 through the piston entry tube 88. The piston plunger 85 is operatively coupled with the piston solenoid 86 and is engaged with the piston member 84 through the piston chamber 91.

Figure 12:
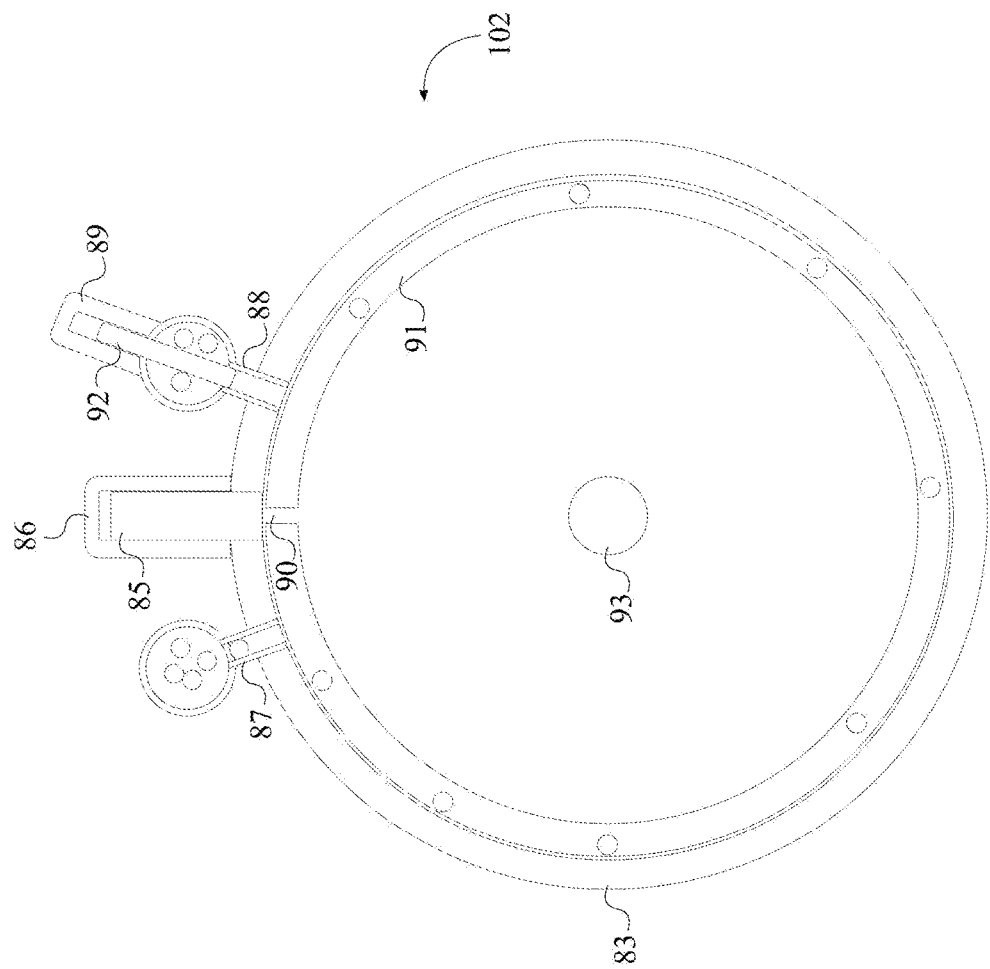
FIG. 12 is a side view of the steam piston assembly and the carbon dioxide piston assembly of the present invention, wherein the piston member is at 0-degree position.

In reference to FIG. 12 shows the 0-degree position of the piston member 84 as the piston partition 90 is at 0-degree position and vertically positioned with the piston plunger 85. Furthermore, the piston plunger 85 is at a retracted position and is not engaged with the piston member 84. Simultaneously, the piston supply plunger 92 is at an extended position and blocks the flow of high pressure gas from entering into the piston chamber 91.

Figure 13:
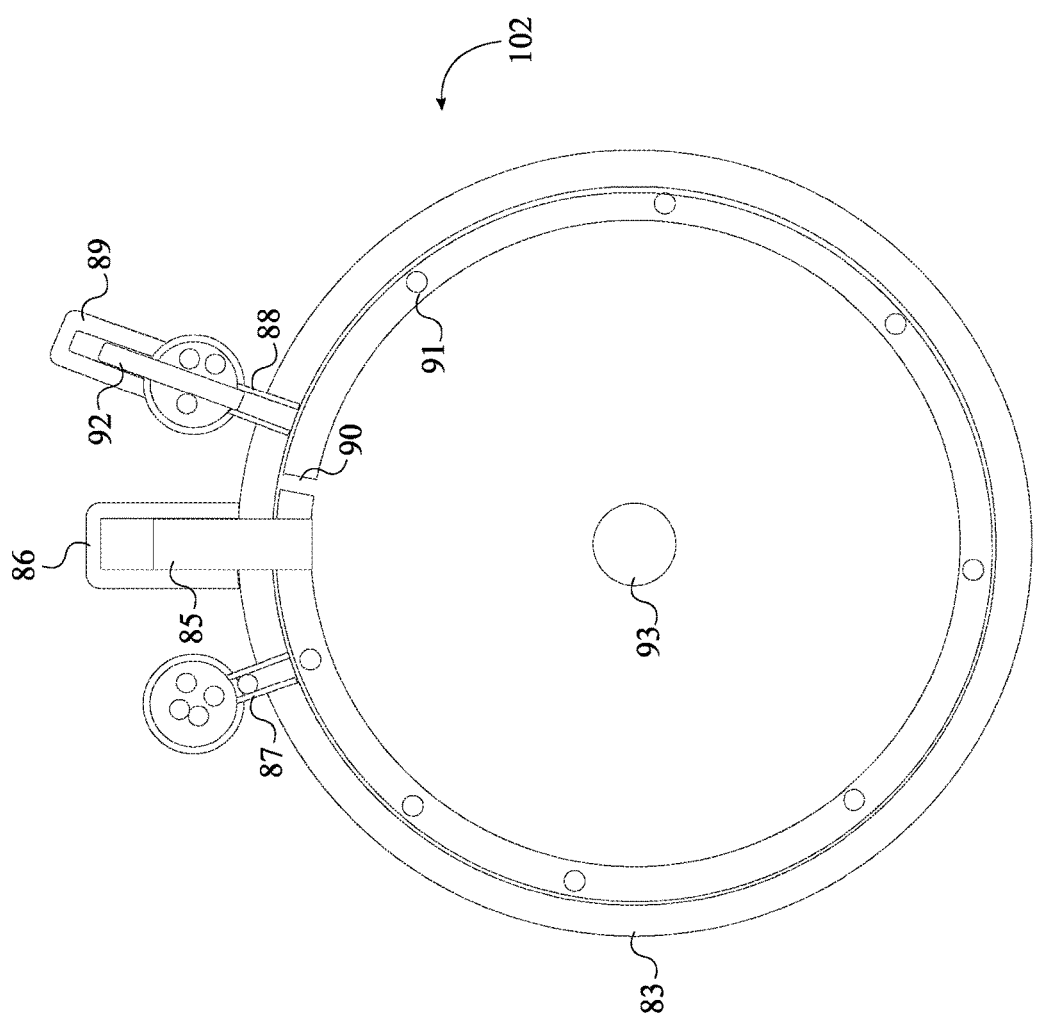
FIG. 13 is a side view of the steam piston assembly and the carbon dioxide piston assembly of the present invention, wherein the piston member is at 10-degree position.

In reference to FIG. 13 shows the 10-degree position of the piston member 84 as the piston partition 90 is at 10-degree position and angularly positioned with the piston plunger 85. Furthermore, the piston plunger 85 is at an extended position and is engaged with the piston member 84. Simultaneously, the piston supply plunger 92 is at an extended position and blocks the flow of high pressure gas from entering into the piston chamber 91.

Figure 14:
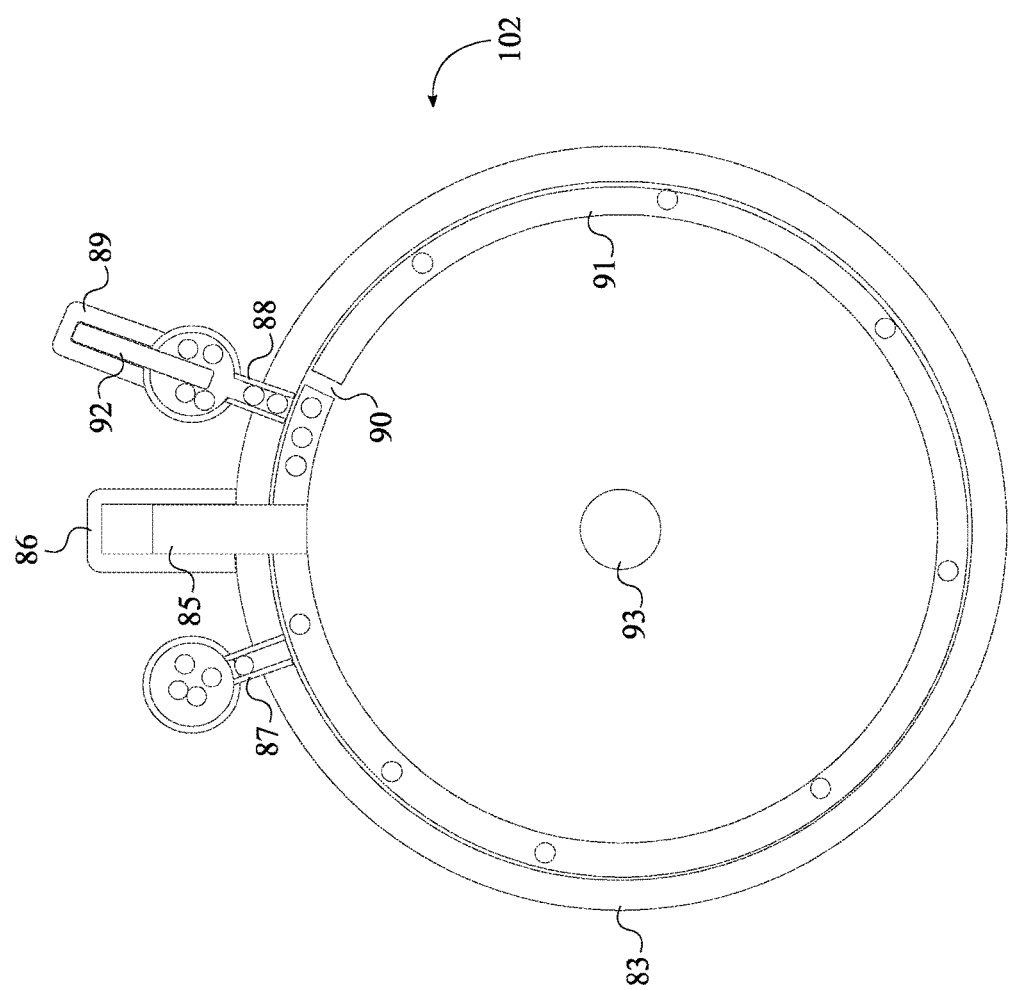
FIG. 14 is a side view of the steam piston assembly and the carbon dioxide piston assembly of the present invention, wherein the piston member is at 20-degree position.

In reference to FIG. 14 shows the 20-degree position of the piston member 84 as the piston partition 90 is at 20-degree position and angularly positioned with the piston plunger 85. Furthermore, the piston plunger 85 is at an extended position and is engaged with the piston member 84. Simultaneously, the piston supply plunger 92 is at a retracted position and allows the flow of high pressure gas to enter into the piston chamber 91. The flow of high pressure gas is then collected within a collection zone of the piston chamber 91, where the collection space extends from the piston plunger 85 to the piston partition 90, thus creating rotational motive force.

Figure 15:
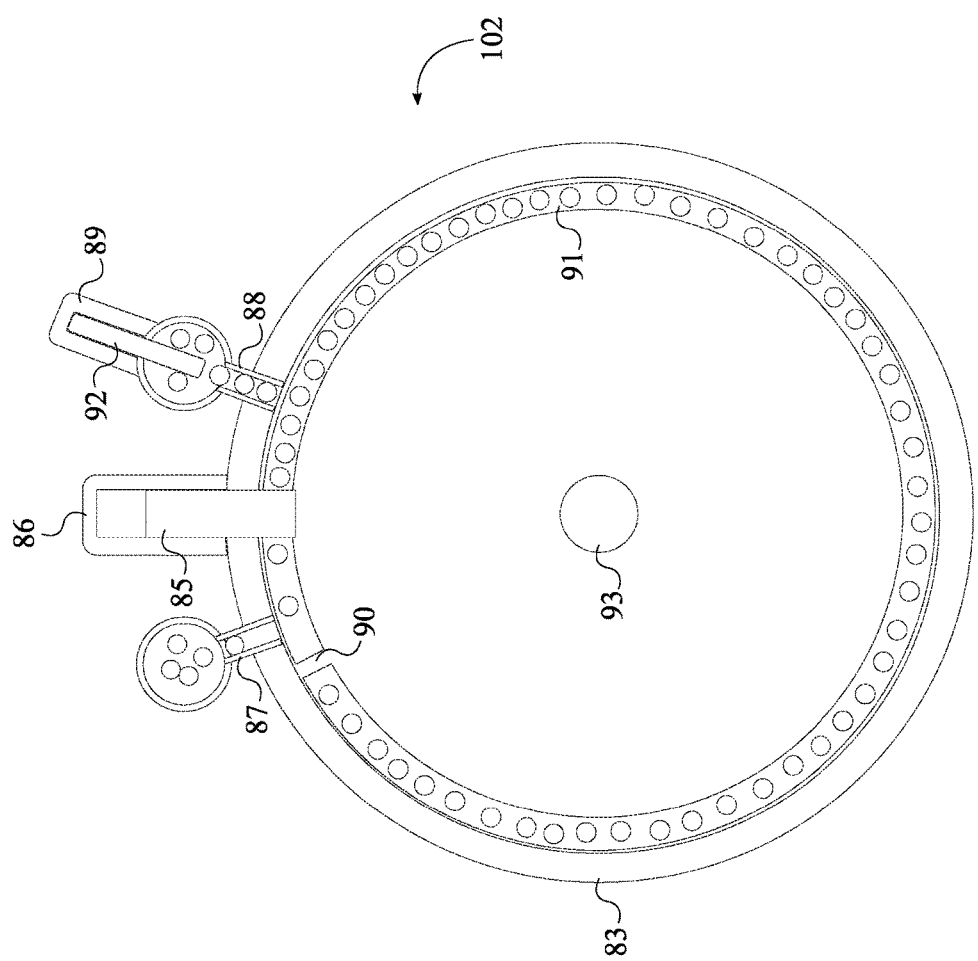
FIG. 15 is a side view of the steam piston assembly and the carbon dioxide piston assembly of the present invention, wherein the piston member is at 340-degree position.

In reference to FIG. 15 shows the 340-degree position of the piston member 84 as the piston partition 90 is at 340-degree position and angularly positioned with the piston plunger 85. Furthermore, the piston plunger 85 is at an extended position and is engaged with the piston member 84. Simultaneously, the piston supply plunger 92 is at an extended position and prevents the flow of high pressure gas from entering into the piston chamber 91. Since the flow of high pressure gas is collected within the collection zone of the piston chamber 91, the flow of high pressure gas continues to create rotational motive force.

Figure 16:
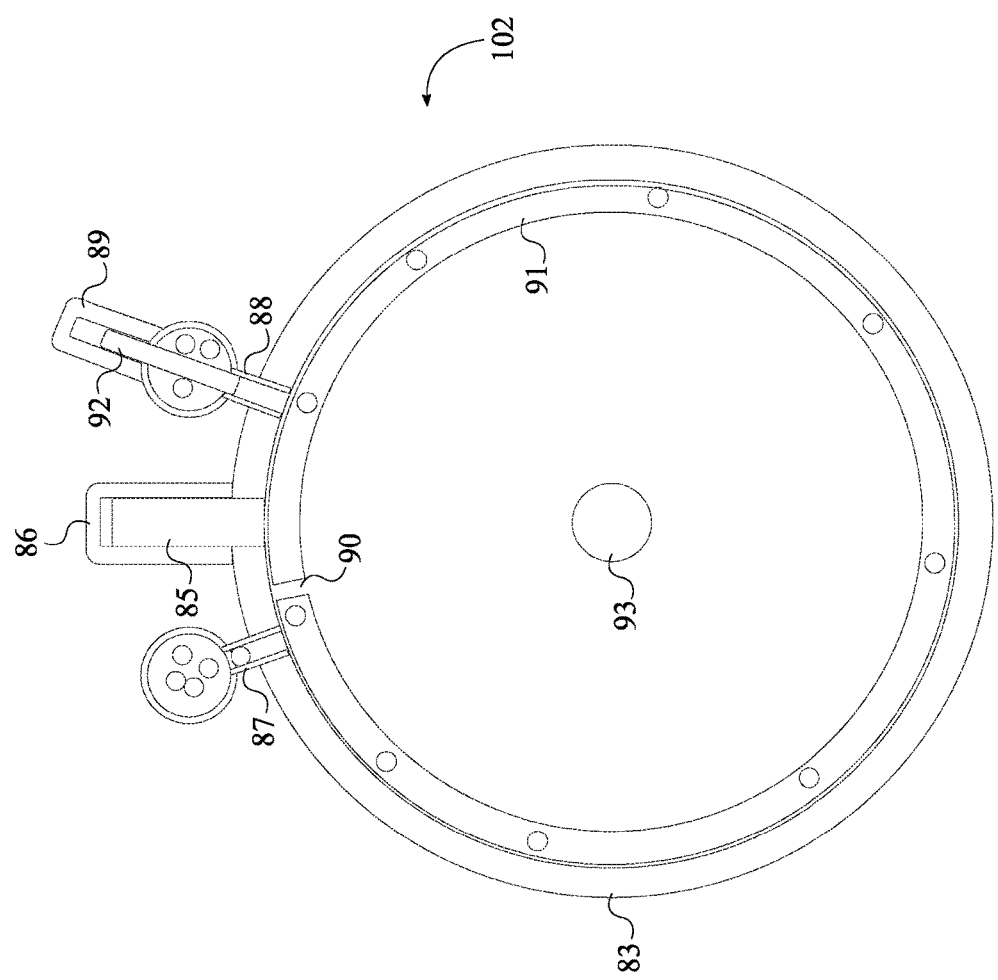
FIG. 16 is a side view of the steam piston assembly and the carbon dioxide piston assembly of the present invention, wherein the piston member is at 350-degree position.

In reference to FIG. 16 shows the 350-degree position of the piston member 84 as the piston partition 90 is at 350-degree position and angularly positioned with the piston plunger 85. Furthermore, the piston plunger 85 is at a retracted position and eliminates the collection zone of the piston chamber 91. In other words, the collection zone is eliminated within the piston chamber 91 due to that fact that the piston partition 90 positions in between the piston exit tube 87 and piston plunger 85. Simultaneously, the piston supply plunger 92 is at an extended position and prevents the flow of high pressure gas from entering into the piston chamber 91. As a result, the flow of high pressure gas within the piston chamber 91 discharges as the flow of low pressure gas.

The piston exit tube 87 traverses into the piston chamber 91 and is in fluid communication with the piston chamber 91 so that the flow of high pressure gas can discharge from the piston chamber 91 as the flow of low pressure gas. Additionally, the piston exit tube 87 of the steam piston assembly 82 is in fluid communication with the steam exit tube 94 Similarly, the piston exit tube 87 of the carbon dioxide piston assembly 102 is in fluid communication with the carbon dioxide exit tube 103. As a result, the flow of high pressure gas is able to discharge from the piston chamber 91 as the flow of low pressure gas. For example, the flow of low pressure gas that discharges from the steam piston assembly 82 and the carbon dioxide piston assembly 102 now has a low pressure, lower temperature, and higher density than the flow of high pressure gas that enters into the steam piston assembly 82 and the carbon dioxide piston assembly 102.

Figure 17:
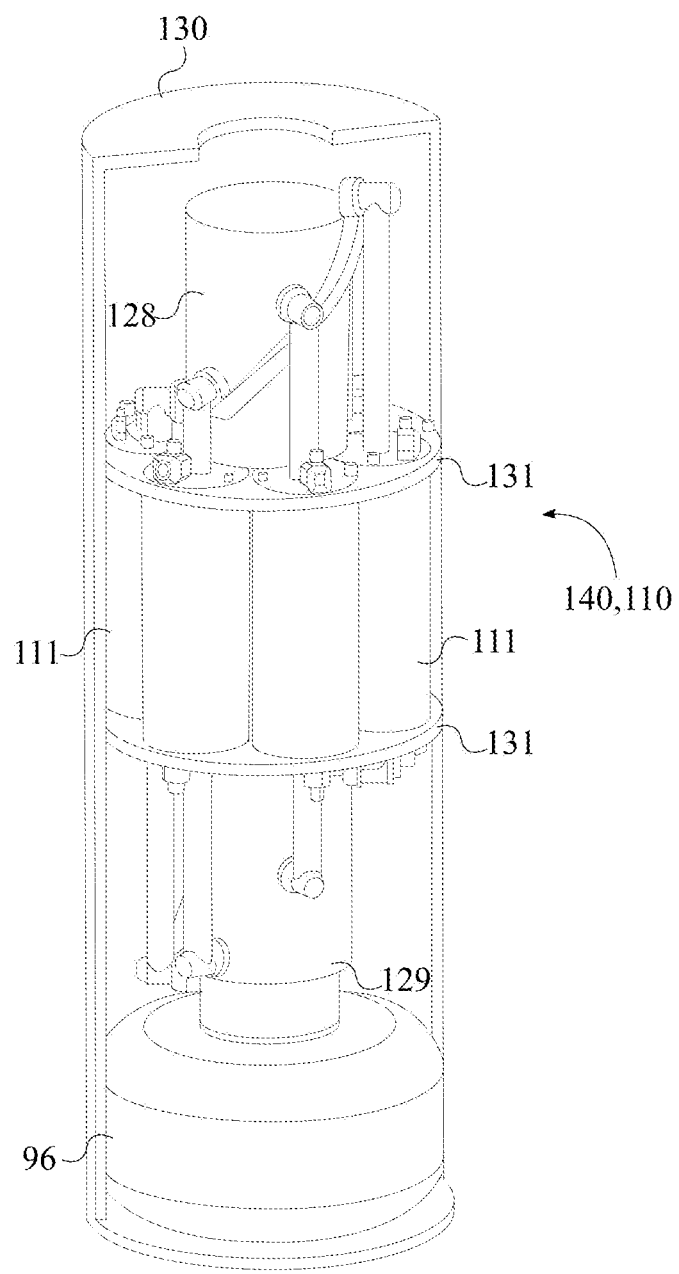
FIG. 17 is a perspective section view of the carbon dioxide carousel motor unit and the steam carousel motor unit of the present invention.

The steam carousel motor unit 110 generates linear mechanical force through the flow of steam as the steam rotary piston motor unit 80 discharges the flow of steam. The linear mechanical force is then converted into electrical current through the steam carousel motor unit 110. In reference to FIG. 4 and FIG. 17, the steam carousel motor unit 110 comprises a plurality of heat exchanger cylinders 111, a carousel steam inlet 125, a carousel water outlet 126, the generator unit 96, a clockwise drive 128, a counter clockwise drive 129, a carousel case 130, and a carousel baffle 131. More specifically, the carousel baffle 131 functions as the securing member as the plurality of heat exchanger cylinders 111 is connected to the carousel case 130 through the carousel baffle 131. The plurality of heat exchanger cylinders 111 is operatively coupled with the generator unit 96 by the clockwise drive 128 and the counter clockwise drive 129. The carousel steam inlet 125 and the carousel water outlet 126 traverse into the carousel case 130 and are in fluid communication with each other through the plurality of heat exchanger cylinders 111 within the carousel case 130. In order to capture the flow of steam from the steam rotary piston motor unit 80, the carousel steam inlet 125 is in fluid communication with the steam exit tube 94. As a result, the flow of steam is able to travel through the steam carousel motor unit 110 generating electrical current. The carousel water outlet 126 is in fluid communication with the carousel case 130 to provide a path for the flow of steam that exits the steam carousel motor unit 110. Additionally, the tube inlet 71 of the internal water tube 69 is in fluid communication with the carousel water outlet 126 to provide a path for the flow of water to the internal water tube 69 of the exchanger coil 68. Furthermore, the steam carousel motor unit 110 releases the flow of steam with higher pressure, lower temperature, and higher density characteristics compare to the flow of steam that enters into the steam carousel motor unit 110.

The carbon dioxide carousel motor unit 140 generates linear mechanical force through the flow of carbon dioxide gas compound as the carbon dioxide rotary piston motor unit 100 discharges the flow of carbon dioxide gas compound. The linear mechanical force is then converted into electrical current through the carbon dioxide carousel motor unit 140. In reference to FIG. 4 and FIG. 17, the carbon dioxide carousel motor unit 140 comprises a plurality of heat exchanger cylinders 111, a carousel carbon dioxide inlet 141, a carousel carbon dioxide outlet 142, a generator unit 96, a clockwise drive 128, a counter clockwise drive 129, a carousel case 130, and a carousel baffle 131. More specifically, the carousel baffle 131 functions as the securing member as the plurality of heat exchanger cylinders 111 is connected to the carousel case 130 through the carousel baffle 131. The plurality of heat exchanger cylinders 111 is operatively coupled with the generator unit 96 by the clockwise drive 128 and the counter clockwise drive 129. The carousel carbon dioxide inlet 141 and the carousel carbon dioxide outlet 142 traverse into the carousel case 130 and are in fluid communication with each other through the plurality of heat exchanger cylinders 111 within the carousel case 130. In order to capture the flow of carbon dioxide gas compound from the carbon dioxide rotary piston motor unit 100, the carousel carbon dioxide inlet 141 is in fluid communication with the carbon dioxide exit tube 103. As a result, the flow of carbon dioxide gas compound is able to travel through the carbon dioxide carousel motor unit 140 generating electrical current. The carousel carbon dioxide outlet 142 is in fluid communication with the carousel case 130 to provide a path for the flow of carbon dioxide compound gas that exits the carbon dioxide carousel motor unit 140. Furthermore, the carbon dioxide carousel motor unit 140 releases the flow of carbon dioxide gas compound with higher pressure, lower temperature, and higher density characteristics compare to the flow of carbon dioxide gas compound that enters into the carbon dioxide carousel motor unit 140.

Each of the plurality of heat exchanger cylinders 111 that is utilized within the steam carousel motor unit 110 and the carbon dioxide carousel motor unit 140 removes heat energy from the flow of steam. In reference to FIG. 18-19, each of the plurality of heat exchanger cylinders 111 comprises an outer casing 112, an inner casing 113, a heat exchange chamber 114, a heat exchange coil 115, a coil inlet 116, a coil outlet 117, a piston unit 118, a first chamber 119, a second chamber 120, a first directional valve 121, a second directional valve 122, a chamber inlet 123, and a chamber outlet 124. The outer casing 112 and the inner casing 113 are concentrically connected to each other and form the heat exchange chamber 114. The heat exchange coil 115 is radially positioned within the heat exchange chamber 114. The piston unit 118 is axially positioned within the inner casing 113 and forms the first chamber 119 and the second chamber 120 within the inner casing 113. A first cap of the inner casing 113 and the piston unit 118 delineate the first chamber 119 while a second cap of the inner casing 113 and the piston unit 118 delineate the second chamber 120. The first directional valve 121 is selectively in fluid communication with the first chamber 119 and the heat exchange chamber 114. The second directional valve 122 is selectively in fluid communication with the second chamber 120 and the heat exchange chamber 114. The chamber inlet 123 is in fluid communication with the first chamber 119. The chamber outlet 124 is in fluid communication with the heat exchange chamber 114.

Figure 18:
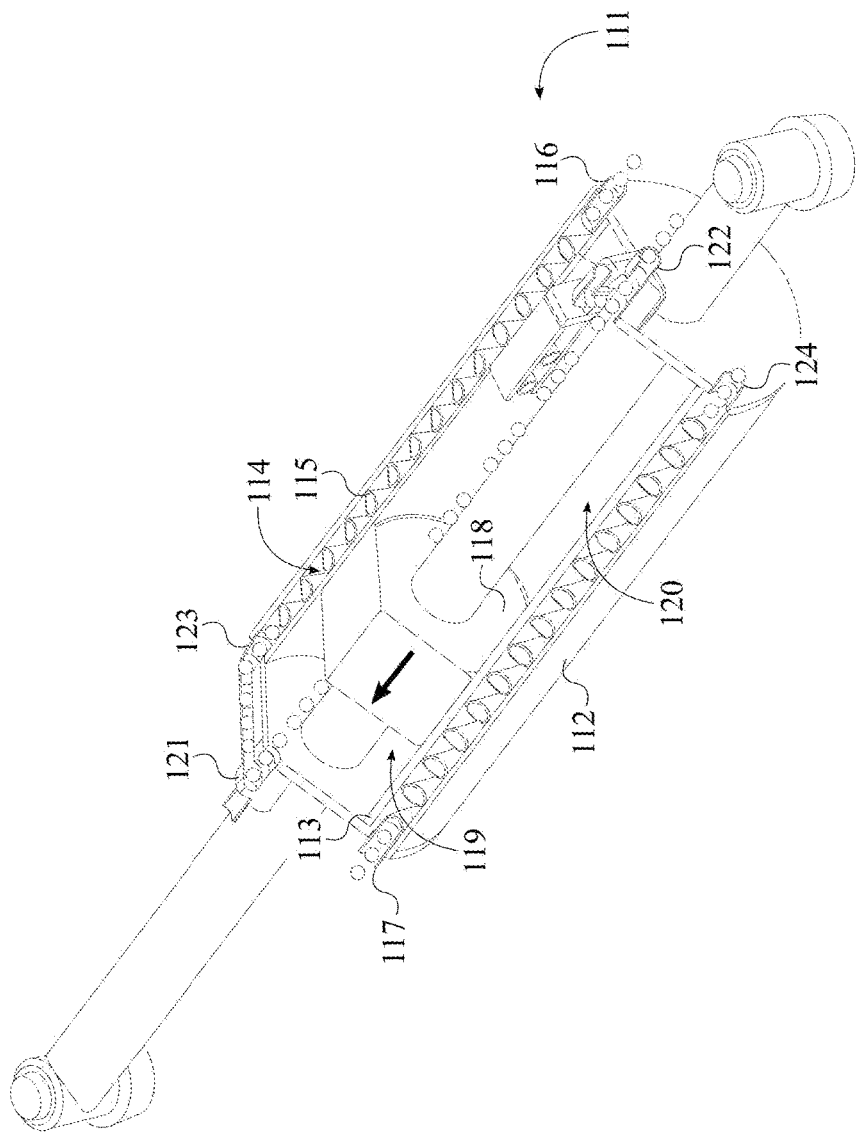
FIG. 18 is a perspective section view of the heat exchanger cylinder of the of the carbon dioxide carousel motor unit and the steam carousel motor unit, showing the movement of the piston unit towards the first cap.

In reference to FIG. 18, a secondary flow of steam is supplied to the second chamber 120 through the second directional valve 122 as the second directional valve 122 directs the secondary flow of steam into the second chamber 120. As a result, the secondary flow of steam imports force on the piston unit 118, creating movement towards the first cap. Due to the movement of the piston unit 118 and the blocked status of the first directional valve 121, a quantity of stored steam within the first chamber 119 is forced into the heat exchange chamber 114 through the chamber inlet 123. The quantity of stored steam then transfers heat energy to the heat exchange coil 115 as the coil inlet 116 of the heat exchanger coil 68 is in fluid communication with an external water source. Heat energy within the heat exchange coil 115 then converts water into a supplementary flow of steam as the coil outlet 117 of the heat exchange coil 115 discharges the supplementary flow of steam. Simultaneously, the quantity of stored steam that enters into the heat exchange chamber 114 from the first chamber 119 is discharged through the chamber outlet 124 with higher pressure, lower temperature, and higher density than the quantity of stored steam that enters into the plurality of heat exchanger cylinders 111.

Figure 19:
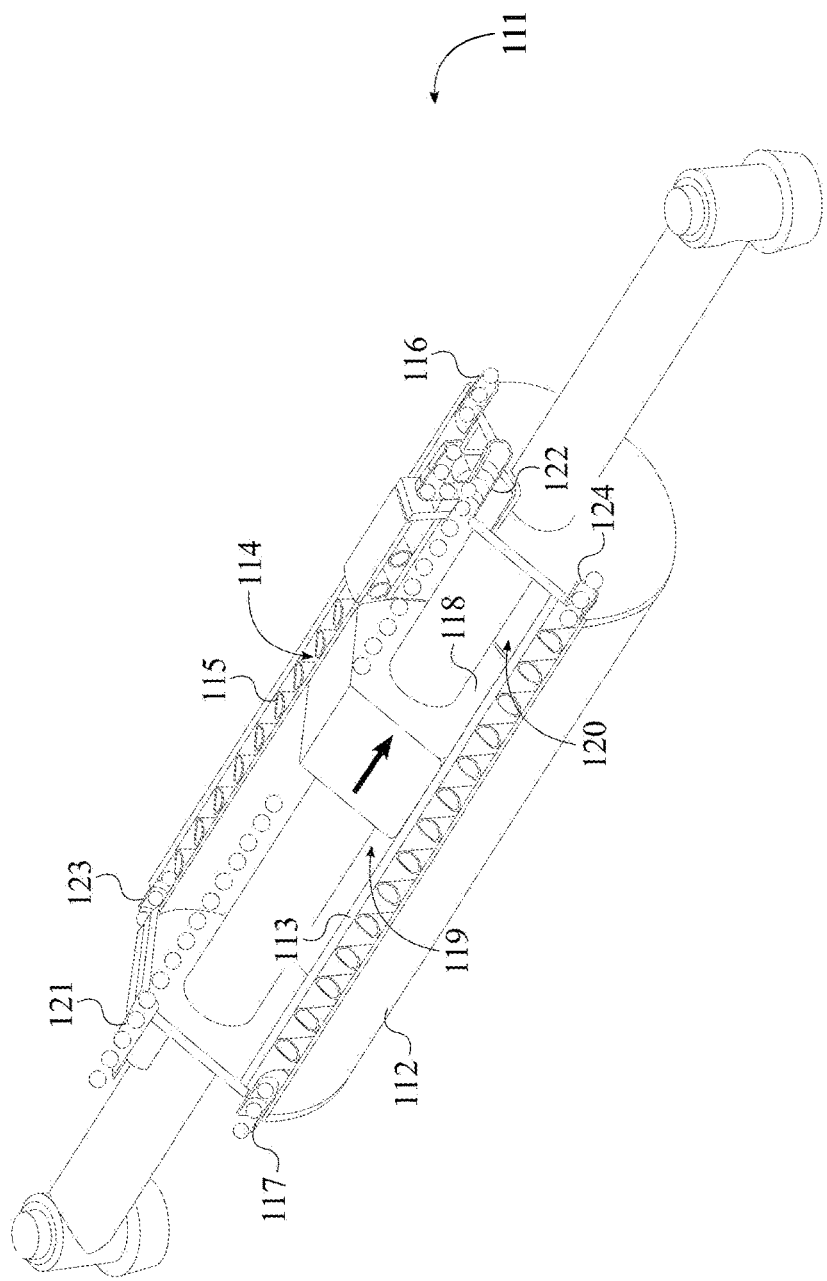
FIG. 19 is a perspective section view of the heat exchanger cylinder of the of the carbon dioxide carousel motor unit and the steam carousel motor unit, showing the movement of the piston unit towards the second cap.

In reference to FIG. 19, the flow of steam is supplied to the first chamber 119 through the first directional valve 121 as the first directional valve 121 is in fluid communication with the steam exit tube 94 via the carousel steam inlet 125. The first directional valve 121 then directs the flow of steam into the first chamber 119 and the heat exchange chamber 114 through the chamber inlet 123. As a result, the flow of steam imports force on the piston unit 118, creating movement towards the second cap. Due to the movement of the piston unit 118 and the partially blocked status of the second directional valve 122, a quantity of stored steam within the second chamber 120 is forced into the heat exchange chamber 114 through the second directional valve 122. The quantity of stored steam transfers heat energy to the heat exchange coil 115 as the coil inlet 116 of the heat exchanger coil 68 is in fluid communication with an external water source. Heat energy within the heat exchange coil 115 then converts water into a supplementary flow of steam as the coil outlet 117 of the heat exchange coil 115 discharges the supplementary flow of steam with lower pressure, lower temperature, and higher density than the flow of steam that enters into the second chamber 120. Simultaneously, the flow of steam that enters into the heat exchange chamber 114 from the first chamber 119 is discharged through the chamber outlet 124.

In reference to FIG. 18, a secondary flow of steam is supplied to the second chamber 120 through the second directional valve 122 as the second directional valve 122 directs the secondary flow of steam into the second chamber 120. As a result, the secondary flow of steam imports force on the piston unit 118, creating movement towards the first cap. Due to the movement of the piston unit 118 and the blocked status of the first directional valve 121, a quantity of stored carbon dioxide gas compound within the first chamber 119 is forced into the heat exchange chamber 114 through the chamber inlet 123. The quantity of stored carbon dioxide gas compound transfers heat energy to the heat exchange coil 115 as the coil inlet 116 of the heat exchanger coil 68 is in fluid communication with an external water source. Heat energy within the heat exchange coil 115 then converts water into a supplementary flow of steam as the coil outlet 117 of the heat exchange coil 115 discharges the supplementary flow of steam. Simultaneously, the quantity of stored carbon dioxide gas compound that enters into the heat exchange chamber 114 from the first chamber 119 is discharged through the chamber outlet 124 with higher pressure, lower temperature, and higher density than the quantity of stored carbon dioxide gas compound that enters into the plurality of heat exchanger cylinders 111.

In reference to FIG. 19, the flow of carbon dioxide gas compound is supplied to the first chamber 119 through the first directional valve 121 as the first directional valve 121 is in fluid communication with the carbon dioxide exit tube 103 via the carousel carbon dioxide inlet 141. The first directional valve 121 then directs the flow of carbon dioxide gas compound into the first chamber 119 and the heat exchange chamber 114 through the chamber inlet 123. As a result, the flow of carbon dioxide gas compound imports force on the piston unit 118, creating movement towards the second cap. Due to the movement of the piston unit 118 and the partially blocked status of the second directional valve 122, a quantity of stored steam within the second chamber 120 is forced into the heat exchange chamber 114 through the second directional valve 122. The quantity of stored steam transfers heat energy to the heat exchange coil 115 as the coil inlet 116 of the heat exchanger coil 68 is in fluid communication with an external water source. Heat energy within the heat exchange coil 115 then converts water into a supplementary flow of steam as the coil outlet 117 of the heat exchange coil 115 discharges the supplementary flow of steam with lower pressure, lower temperature, and higher density than the flow of steam that enters into the second chamber 120. Simultaneously, the flow of carbon dioxide gas compound that enters into the heat exchange chamber 114 from the first chamber 119 is discharged through the chamber outlet 124.

The duel drum motor unit 150 captures the flow of steam and the flow of carbon dioxide gas compound to convert mechanical energy to the electrical energy within the present invention. In reference to FIG. 5, the duel drum motor unit 150 comprises a drum assembly 151, a pair of generators 156, a duel drum motor inlet tube 157, and a duel drum motor exit tube 158. The duel drum motor unit 150 is operatively coupled with the pair of generators 156. More specifically, duel drum motor unit 150 further comprises a motor case 152, drum chamber 153, a first drum 154, and a second drum 155. The first drum 154 and the second drum 155 are internally positioned with the motor case 152 and forms the drum chamber 153 that extends from the first drum 154 and the second drum 155 to motor case 152. The first drum 154 and the second drum 155 are operatively coupled with one of the generator form the pair of generators 156. The first drum 154 is configured to rotate in counter clockwise direction while the second drum 155 is configured to rotate in clockwise direction. The duel drum motor inlet tube 157 and the duel drum motor exit tube 158 are in fluid communication with the drum assembly 151 through the motor case 152. Furthermore, the duel drum motor inlet tube 157 is in fluid communication with the steam exit tube 94 of the steam rotary piston motor unit 80 to capture the flow of steam and the carbon dioxide exit tube 103 of the carbon dioxide rotary piston motor unit 100 to capture the flow of carbon dioxide gas compound. When the flow of steam and the flow of carbon dioxide gas compound enter into the drum assembly 151, the flow of steam and the flow of carbon dioxide gas compound are configured to exit the duel drum motor unit 150 through the duel drum motor exit tube 158.

Figure 20:
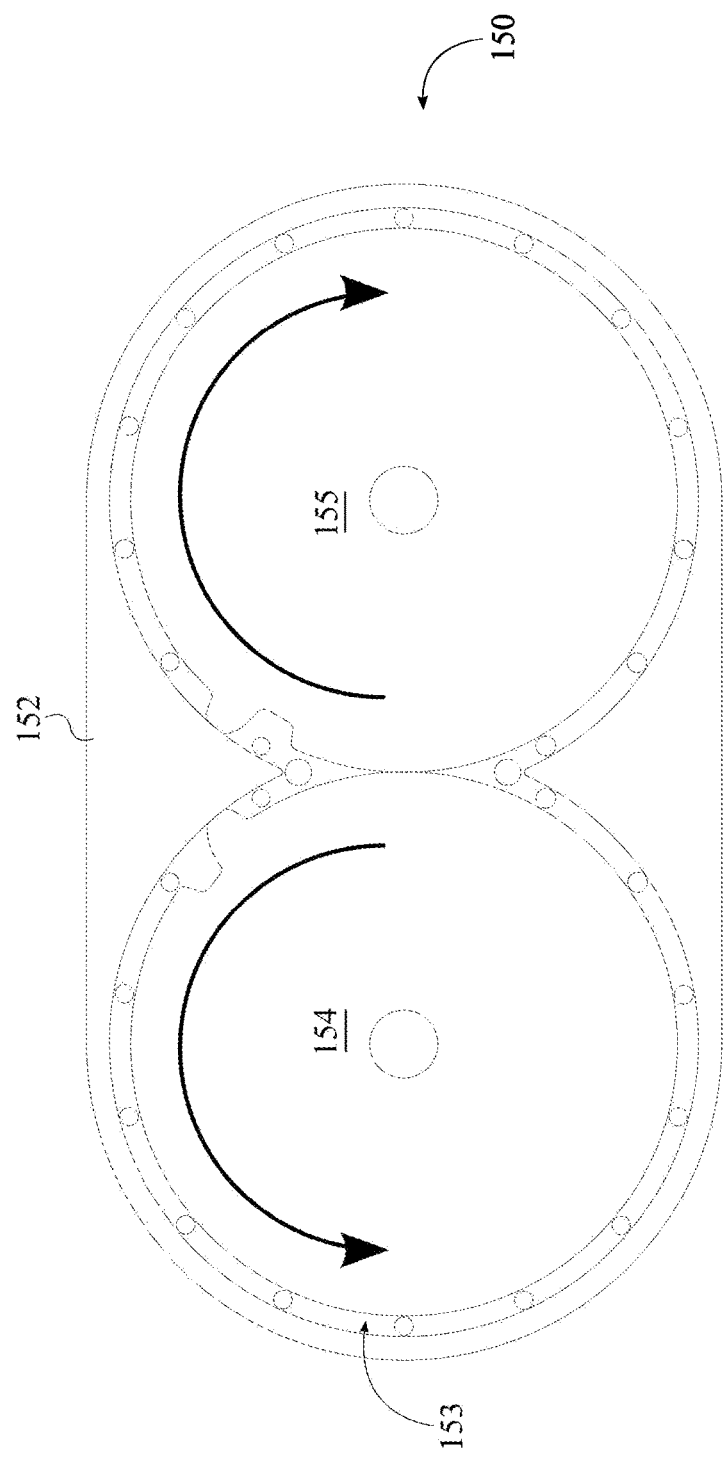
FIG. 20 is an internal view of the duel drum motor unit showing the first drum and the second drum, wherein the duel drum motor unit is at on-position.
Figure 21:
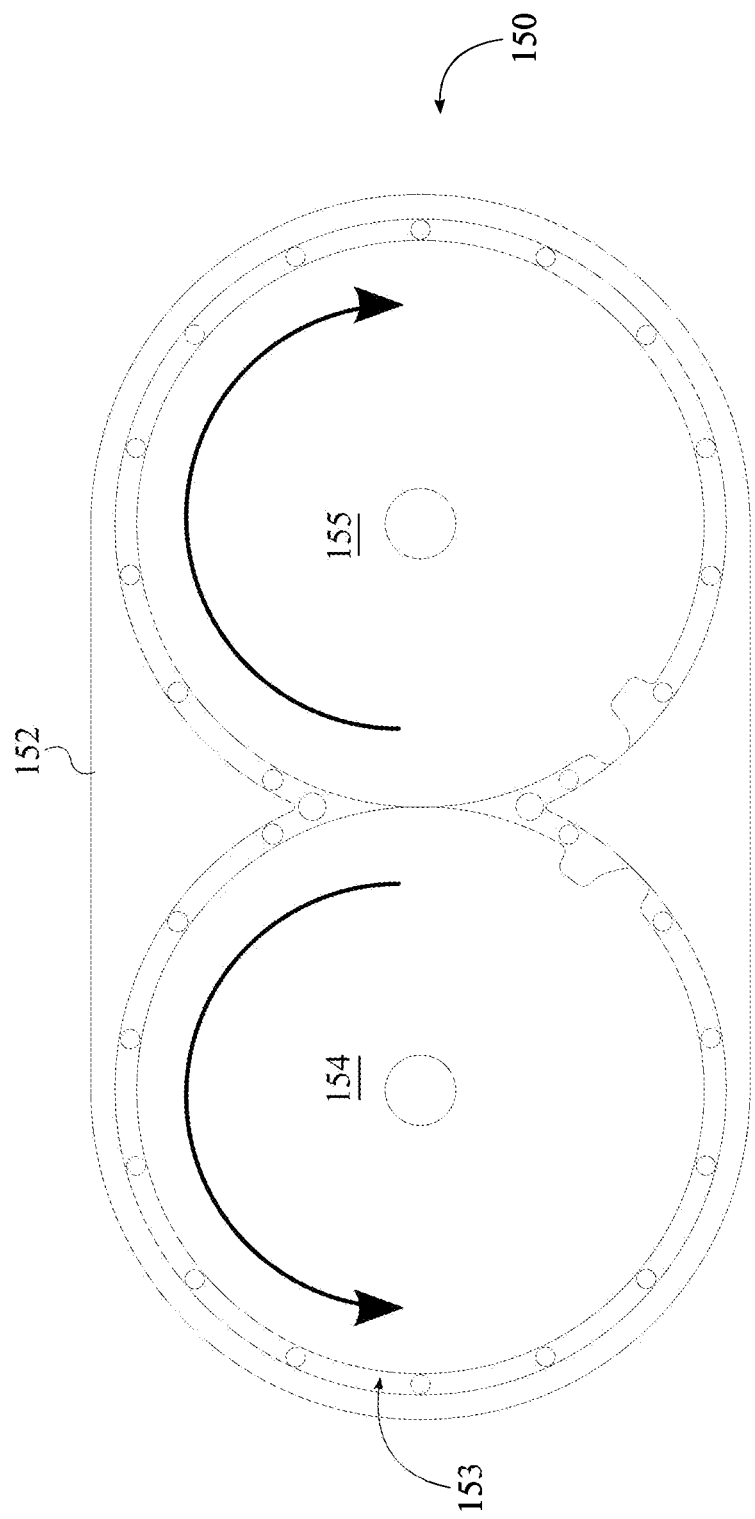
FIG. 21 is an internal view of the duel drum motor unit showing the first drum and the second drum, wherein the duel drum motor unit is at off-position.

In reference to FIG. 20-21, the flow of steam and the flow of carbon dioxide gas compound are supplied to the motor case 152 through the duel drum motor inlet tube 157. More specifically, when the drum assembly 151 is at an on-position, the flow of steam and the flow of carbon dioxide gas compound are supplied to the drum chamber 153 through the duel drum motor inlet tube 157 while the flow rate is controlled through a control valve. Then the first drum 154 is rotated in counter clockwise direction and the second drum 155 is rotated in clockwise direction, rotating the respective generator from the pair of generators 156. Due to the continues flow rate of the flow of steam and the flow of carbon dioxide gas compound, the first drum 154 and the second drum 155 continue to rotate within the motor case 152 until the drum assembly 151 reaches an off-position. Then, the control valve prevents the flow of steam and the flow of carbon dioxide gas compound from entering into the drum chamber 153 while allowing the pressurized steam and carbon dioxide within the drum chamber 153 to exit via the duel drum motor exit tube 158, completing a single cycle. The duel drum motor unit 150 continuously repeats the same process in order to complete multiple cycles within the duel drum motor unit 150 as long as the flow of steam and the flow of carbon dioxide gas compound are supplied from the steam exit tube 94 and the carbon dioxide exit tube 103.

The compressor unit 160 collets the flow of steam and the flow of carbon dioxide gas compound so that the exhaust gases of the present invention can be separated and stored within the respective storage containers. More specifically, the compressor unit 160 collects the flow of steam from the steam carousel motor unit 110 and the duel drum motor unit 150. The compressor unit 160 collects the flow of carbon dioxide from the carbon dioxide carousel motor unit 140 and the duel drum motor unit 150. In reference to FIG. 6-7, the compressor unit 160 comprises at least one condenser 161, a first directional condenser valve 173, and a second directional condenser valve 174, wherein the at least one condenser 161 is in fluid communication with the first directional condenser valve 173 and the second directional condenser valve 174. The at least one condenser 161 comprises an outer condenser casing 162, an inner condenser casing 163, a condenser heat exchange chamber 164, a condenser heat exchange coil 165, a condenser coil inlet 166, a condenser coil outlet 167, a condenser piston unit 168, a first condenser chamber 169, a second condenser chamber 170, a condenser chamber inlet 171, and a condenser chamber outlet 172. The outer condenser casing 162 and the inner condenser casing 163 are concentrically connected to each other and form the condenser heat exchange chamber 164. The condenser heat exchange coil 165 is radially positioned within the condenser heat exchange chamber 164. The condenser piston unit 168 is axially positioned within the inner condenser casing 163 and forms the first condenser chamber 169 and the second condenser chamber 170. A first condenser cap of the inner condenser casing 163 and the condenser piston unit 168 delineate the first condenser chamber 169 while a second condenser cap of the inner condenser casing 163 and the condenser piston unit 168 delineate the second condenser chamber 170. The first directional condenser valve 173 is selectively in fluid communication with the first condenser chamber 169 and the condenser chamber inlet 171. The second directional condenser valve 174 is selectively in fluid communication with the second condenser chamber 170 and the condenser coil inlet 166. The condenser chamber outlet 172 is in fluid communication with the condenser heat exchange chamber 164. In reference to FIG. 6-7, the carousel water outlet 126 and the duel drum motor exit tube 158 are in fluid communication with the compressor unit 160 to collect the flow of steam. Similarly, the carousel carbon dioxide outlet 142 and the duel drum motor exit tube 158 are in fluid communication with the compressor unit 160 to collect the flow of carbon dioxide gas compound.

Figure 6:
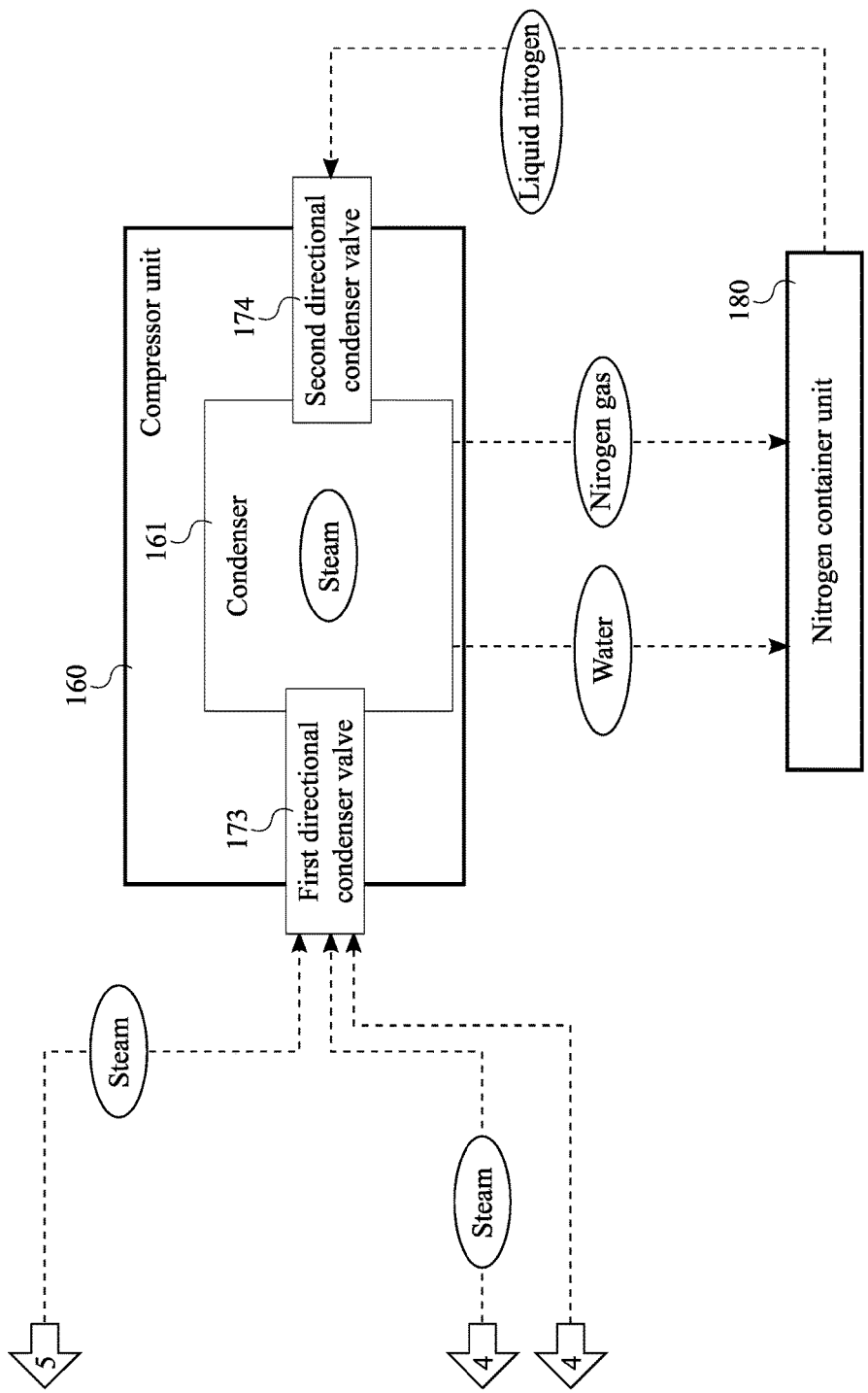
FIG. 6 is a basic flow chart illustrating the compressor unit in relation to the flow of steam within the overall system of the present invention.
Figure 22:
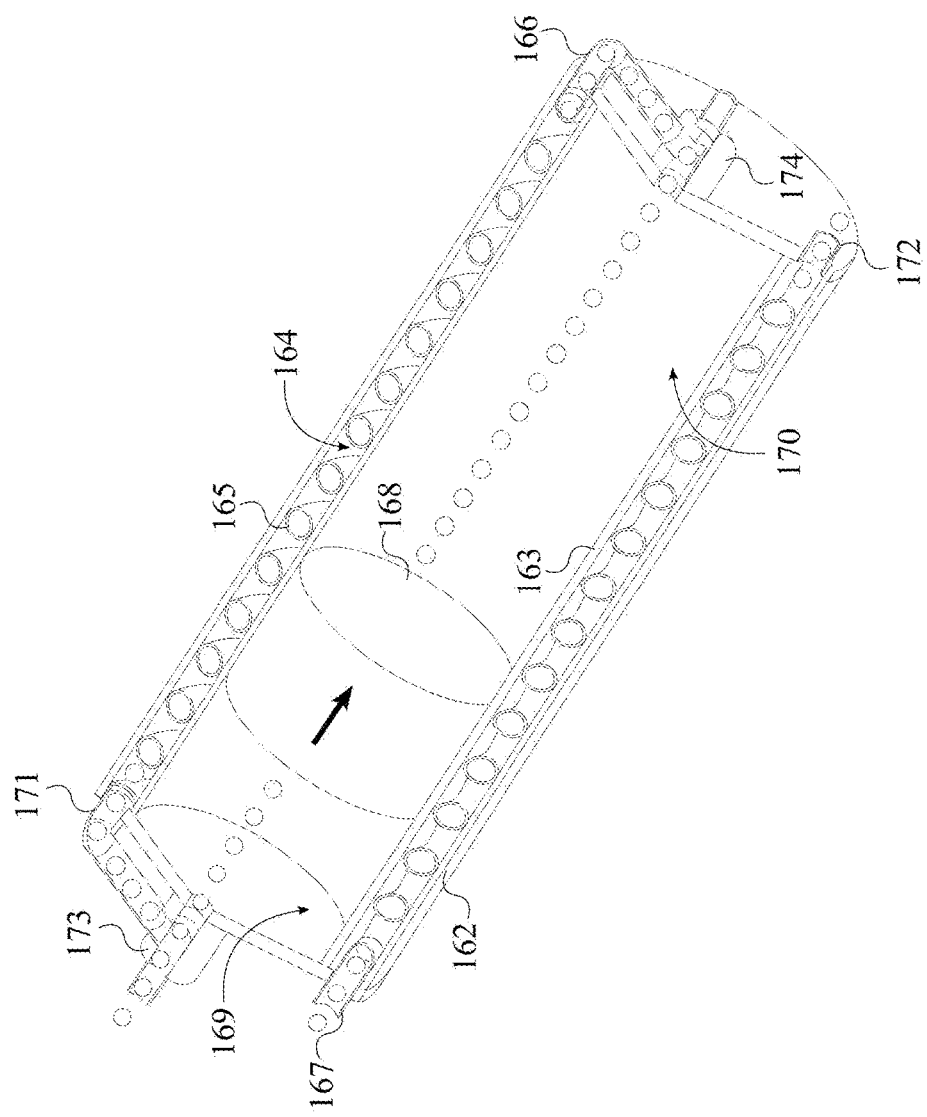
FIG. 22 is a perspective section view of the at least one condenser, showing the movement of the condenser piston unit towards the second condenser cap.
Figure 23:
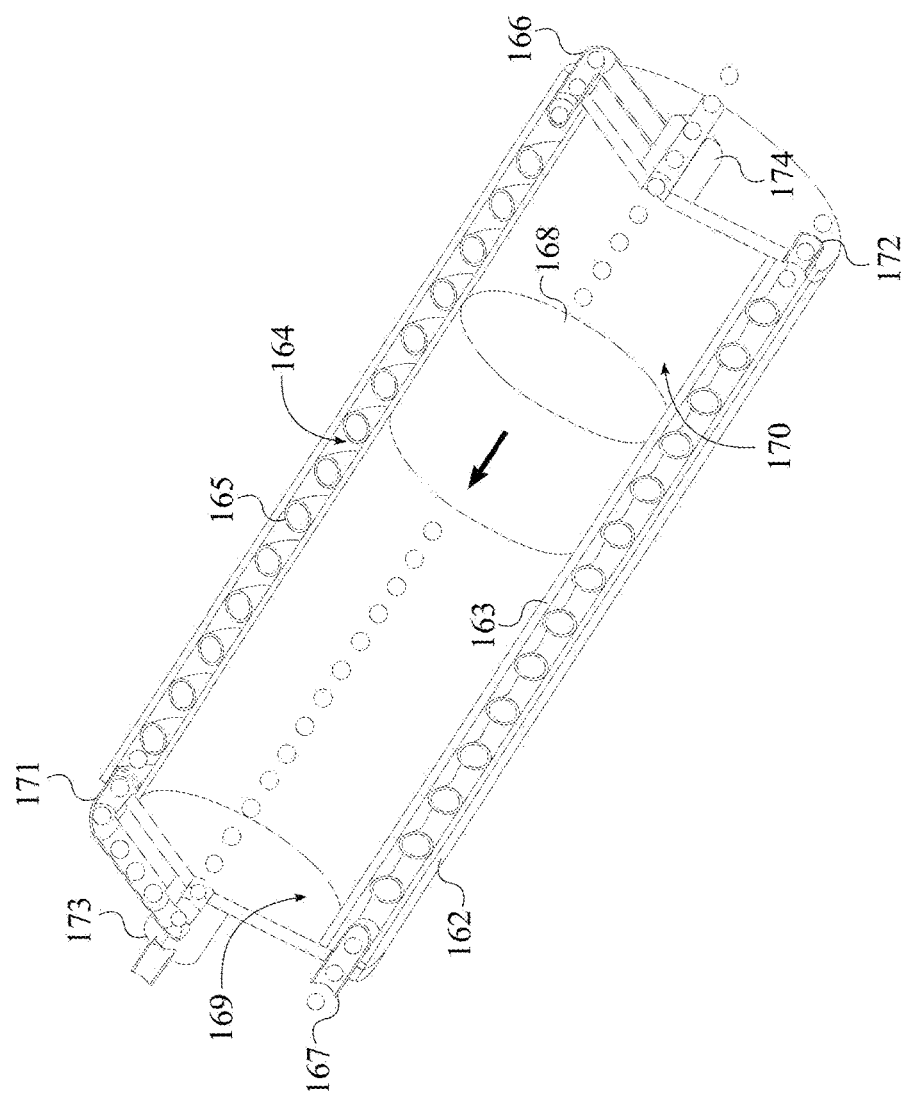
FIG. 23 is a perspective section view of the at least one condenser, showing the movement of the condenser piston unit towards the first condenser cap.

In reference to FIG. 6, FIG. 22, and FIG. 23, the flow of steam is supplied to the first condenser chamber 169 through the first directional condenser valve 173 as the first directional condenser valve 173 directs the flow of steam into the first condenser chamber 169. As a result, the flow of steam imports force on the condenser piston unit 168, creating movement towards the second condenser cap. Due to the movement of the condenser piston unit 168 and the blocked status of the second directional condenser valve 174, a quantity of stored nitrogen gas within the second condenser chamber 170 is forced into the condenser heat exchange coil 165 through the condenser coil inlet 166. When the condenser piston unit 168 positioned adjacent to the second condenser cap, a flow of nitrogen gas is supplied to the second condenser chamber 170 through the second directional condenser valve 174 as the second directional condenser valve 174 is in fluid communication with a nitrogen container unit 180. The second directional condenser valve 174 then directs the flow of nitrogen into the second condenser chamber 170. As a result, the flow of nitrogen imports force on the condenser piston unit 168, creating movement towards the first condenser cap. Due to the movement of the condenser piston unit 168 and the blocked status of the first directional condenser valve 173, a quantity of stored steam within the first condenser chamber 169 is forced into the condenser heat exchange chamber 164 through the first directional condenser valve 173. As a result, the quantity of stored steam transfers heat energy to the flow of nitrogen gas of the condenser heat exchange coil 165. Since heat energy is removed from the quantity of stored steam to the condenser heat exchange coil 165, the quantity of stored steam converts into a supplementary flow of water within the condenser heat exchange chamber 164. The quantity of stored steam that enters into the condenser heat exchange chamber 164 from the first condenser chamber 169 is then discharged through the condenser chamber outlet 172 with ideal pressure and temperature condenses to water. Simultaneously, the condenser coil outlet 167 of the condenser heat exchange coil 165 discharges the flow of nitrogen.

Figure 7:
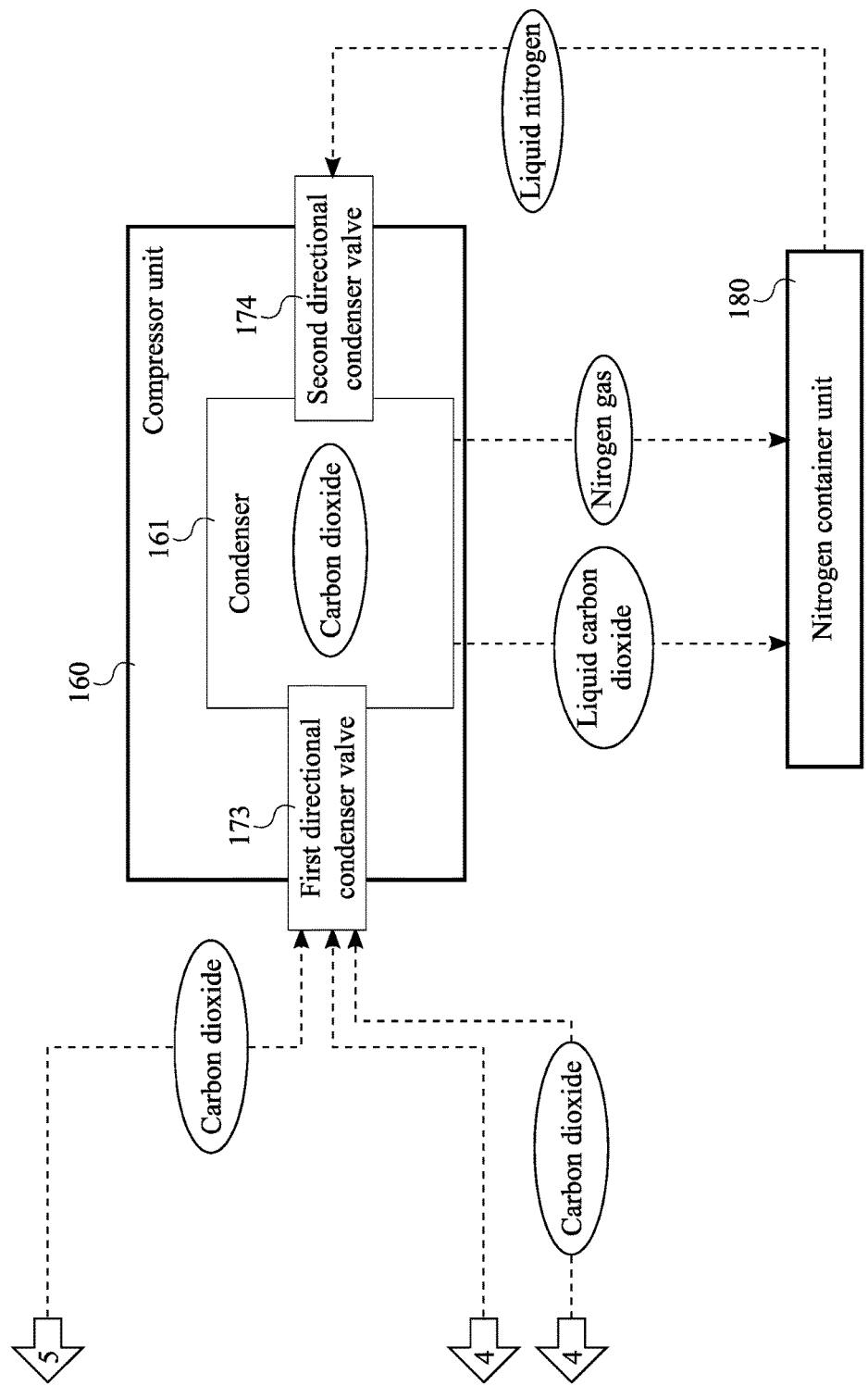
FIG. 7 is a basic flow chart illustrating the compressor unit in relation to the flow of carbon dioxide within the overall system of the present invention

In reference to FIG. 7, FIG. 22, and FIG. 23, the flow of carbon dioxide gas compound is supplied to the first condenser chamber 169 through the first directional condenser valve 173 as the first directional condenser valve 173 directs the flow of carbon dioxide gas compound into the first condenser chamber 169. As a result, the flow of carbon dioxide gas compound imports force on the condenser piston unit 168, creating movement towards the second condenser cap. Due to the movement of the condenser piston unit 168 and the blocked status of the second directional condenser valve 174, a quantity of stored nitrogen gas within the second condenser chamber 170 is forced into the condenser heat exchange coil 165 through the condenser coil inlet 166. When the condenser piston unit 168 positioned adjacent to the second condenser cap, a flow of nitrogen gas is supplied to the second condenser chamber 170 through the second directional condenser valve 174 as the second directional condenser valve 174 is in fluid communication with the nitrogen container unit 180. The second directional condenser valve 174 then directs the flow of nitrogen into the second condenser chamber 170. As a result, the flow of nitrogen imports force on the condenser piston unit 168, creating movement towards the first condenser cap. Due to the movement of the condenser piston unit 168 and the blocked status of the first directional condenser valve 173, a quantity of stored carbon dioxide gas compound within the first condenser chamber 169 is forced into the condenser heat exchange chamber 164 through the first directional condenser valve 173. As a result, the quantity of stored carbon dioxide gas compound transfers heat energy to the flow of nitrogen gas of the condenser heat exchange coil 165. Since heat energy is removed from the quantity of stored carbon dioxide gas compound to the condenser heat exchange coil 165, the quantity of stored carbon dioxide gas compound converts into a flow of liquid carbon dioxide gas compound within the condenser heat exchange chamber 164. The quantity of stored carbon dioxide gas compound that enters into the condenser heat exchange chamber 164 from the first condenser chamber 169 is then discharged through the condenser chamber outlet 172 with ideal pressure and temperature condenses to the liquid carbon dioxide gas compound. Simultaneously, the condenser coil outlet 167 of the condenser heat exchange coil 165 discharges the flow of nitrogen.

Although the invention has been explained in relation to its preferred embodiment, it is to be understood that many other possible modifications and variations can be made without departing from the spirit and scope of the invention as hereinafter claimed.

What is claimed is:

1. A captive oxygen fuel reactor comprises:
an electrolysis unit;
an oxygen unit;
a fuel unit;
a heat exchanger unit;
a steam rotary piston motor unit;
a carbon dioxide rotary piston motor unit;
a steam carousel motor unit
a carbon dioxide carousel motor unit
a duel drum motor unit
a compressor unit;
the electrolysis unit being in series fluid communication with the oxygen unit and the fuel unit;
the fuel unit and the oxygen unit being collectively in fluid communication with the heat exchanger unit;
the heat exchanger unit being in fluid communication with the steam rotary piston motor unit and the carbon dioxide rotary piston motor unit;
the steam rotary piston motor unit being in series in fluid communication with the with the steam carousel motor unit and the duel drum motor unit;
the carbon dioxide rotary piston motor unit being in series in fluid communication with the with the carbon dioxide carousel motor unit and the duel drum motor unit; and
the steam carousel motor unit, the carbon dioxide carousel motor unit, and the duel drum motor unit being in fluid communication with the compressor unit.

2. The captive oxygen fuel reactor as claimed in claim 1 comprises:
the electrolysis unit comprises a hydrogen collection chamber, an oxygen collection chamber, a hydrogen discharge tube, and an oxygen discharge tube;
the hydrogen discharge tube being in fluid communication with the hydrogen collection chamber; and
the oxygen discharge tube being in fluid communication with the oxygen collection chamber.

3. The captive oxygen fuel reactor as claimed in claim 1 comprises:
the oxygen unit comprises an oxygen pressure vessel, an oxygen unit inlet, and an oxygen unit outlet;
the oxygen unit inlet and the oxygen unit outlet being in fluid communication with the oxygen pressure vessel; and
the oxygen unit inlet being in series fluid communication with an oxygen discharge tube of the electrolysis unit.

4. The captive oxygen fuel reactor as claimed in claim 1 comprises:
the fuel unit comprises a hydrogen inlet, a hydrocarbon inlet, a carbon monoxide inlet, a hydrogen container, a hydrocarbon container, a carbon monoxide container, a hydrogen outlet, a hydrocarbon outlet, and a carbon monoxide outlet;
the hydrogen inlet and the hydrogen outlet being in fluid communication with the hydrogen container;
the hydrocarbon inlet and the hydrocarbon outlet being in fluid communication with the hydrocarbon container;
the carbon monoxide inlet and the carbon monoxide outlet being in fluid communication with the carbon monoxide container; and
the hydrogen inlet being in series fluid communication with a hydrogen discharge tube of the electrolysis unit.

5. The captive oxygen fuel reactor as claimed in claim 1 comprises:
the heat exchanger unit comprises a reactor structure unit, a reactor chamber, a reactor unit, an exchanger coil, an oxygen burner, a hydrogen burner, and a carbon monoxide burner;
the reactor chamber being enclosed by the reactor structure unit;
the reactor unit, the oxygen burner, the hydrogen burner, and the carbon monoxide burner being internally positioned with the reactor chamber;
a hydrocarbon outlet of the fuel unit traversing into the reactor chamber through the reactor structure unit;
the hydrocarbon outlet being in fluid communication with the reactor unit;
the reactor unit comprises a receptacle, a reactor outlet, an ash collector outlet, and a gas discharge ring;
the ash collector outlet and the reactor outlet being in fluid communication with the receptacle;
the ash collector outlet traversing from the reactor chamber through the reactor structure unit;
the ash collector outlet being in fluid communication with an ash unit;
the reactor outlet being in fluid communication with the gas discharge ring;
an oxygen unit outlet of the oxygen unit traversing into the reactor chamber through the reactor structure unit;
the oxygen unit outlet being in fluid communication with the oxygen burner;
a hydrogen outlet of the fuel unit traversing into the reactor chamber through the reactor structure unit;
the hydrogen outlet being in fluid communication with the hydrogen burner;
a carbon monoxide outlet of the fuel unit traversing into the reactor chamber through the reactor structure unit;
the carbon monoxide outlet being in fluid communication with the carbon monoxide burner; and
the exchanger coil being positioned in between the reactor chamber and the reactor structure unit.

6. The captive oxygen fuel reactor as claimed in claim 1 comprises:
the heat exchanger unit comprises a reactor structure unit, a reactor chamber, an exchanger coil, and a steam collector;

the reactor chamber being enclosed by the reactor structure unit;

the exchanger coil being positioned in between the reactor chamber and the reactor structure unit;

the exchanger coil comprises an internal water tube and an external carbon dioxide gas tube;

the internal water tube being radially enclosed by the external carbon dioxide gas tube;

a tube inlet of the external carbon dioxide gas tube being in fluid communication with the reactor chamber;

a tube outlet of the external carbon dioxide gas tube traversing through the reactor structure unit;

a tube inlet of the internal water tube traversing through the reactor structure unit;

a tube outlet of the internal water tube being in fluid communication with the steam collector, adjacent to the tube inlet of the external carbon dioxide gas tube; and the steam collector traversing through the reactor structure unit.

7. The captive oxygen fuel reactor as claimed in claim 1 comprises:

the steam rotary piston motor unit comprises a steam supply tube, a steam piston assembly, a steam exit tube, a drive shaft, and a generator unit;

the steam supply tube and the steam exit tube being in fluid communication with the steam piston assembly;

the steam piston assembly being operatively coupled with the generator by the drive shaft; and the steam supply tube being in fluid communication with a steam collector of the heat exchanger unit.

8. The captive oxygen fuel reactor as claimed in claim 1 comprises:

the carbon dioxide rotary piston motor unit comprises a carbon dioxide supply tube, a carbon dioxide piston assembly, a carbon dioxide exit tube, a drive shaft, and a generator unit;

the carbon dioxide supply tube and the carbon dioxide exit tube being in fluid communication with the carbon dioxide piton assembly;

the carbon dioxide piston assembly being operatively coupled with the generator by the drive shaft; and the carbon dioxide supply tube being in fluid communication with an external carbon dioxide gas tube for an exchanger coil of the heat exchanger unit.

9. The captive oxygen fuel reactor as claimed in claim 1 comprises:

the steam carousel motor unit comprises a plurality of heat exchanger cylinders, a carousel steam inlet, a carousel water outlet, a generator unit, a clockwise steam drive, a counter clockwise steam drive, a carousel case, and a carousel baffle;

the plurality of heat exchanger cylinders being connected to the carousel case by the carousel baffle;

the plurality of heat exchanger cylinders being operatively coupled with the generator unit by the clockwise steam drive and the counter clockwise steam drive;

the carousel steam inlet being in fluid communication with the plurality of heat exchanger cylinders through the carousel case;

the carousel steam inlet being in fluid communication with a steam exit tube of the steam rotary piston motor unit;

the carousel water outlet being in fluid communication with the plurality of heat exchanger cylinders through the carousel case; and a tube inlet of the internal water tube for the exchanger coil being in fluid communication with the carousel water outlet.

10. The captive oxygen fuel reactor as claimed in claim 1 comprises:

the carbon dioxide carousel motor unit comprises a plurality of heat exchanger cylinders, a carousel carbon dioxide inlet, a carousel carbon dioxide outlet, a generator unit, a clockwise steam drive, a counter clockwise steam drive, a carousel case, and a carousel baffle;

the plurality of heat exchanger cylinders being operatively coupled with the generator unit by the clockwise steam drive and the counter clockwise steam drive;

the carousel carbon dioxide inlet being in fluid communication with the plurality of heat exchanger cylinders through the carousel case;

the carousel carbon dioxide inlet being in fluid communication with a carbon dioxide exit tube of the carbon dioxide rotary piston motor unit; and the carousel carbon dioxide outlet being in fluid communication with the plurality of heat exchanger cylinders through the carousel case.

11. The captive oxygen fuel reactor as claimed in claim 1 comprises:

the duel drum motor unit comprises a drum assembly, a pair of generators, duel drum motor inlet tube, and a duel drum motor exit tube;

the drum assembly being operatively coupled with the pair of generators;

the duel drum motor inlet tube being in fluid communication with the drum assembly;

the duel drum motor exit tube being in fluid communication with the drum assembly; and the duel drum motor inlet tube being in fluid communication with a steam exit tube of the steam rotary piston motor unit and a carbon dioxide exit tube of the carbon dioxide rotary piston motor unit.

12. The captive oxygen fuel reactor as claimed in claim 1 comprises:

a nitrogen container unit;

the compressor unit comprises at least one condenser, a first directional condenser valve, and a second directional condenser valve;

the first directional condenser valve and the second directional condenser valve being in fluid communication with the at least one condenser;

the first directional condenser valve being in fluid communication with a duel drum motor exit tube of the duel drum motor unit;

the first directional condenser valve being in fluid communication with a carousel water outlet of the steam carousel motor unit; and the second directional condenser valve being in fluid communication with the nitrogen container unit.

13. The captive oxygen fuel reactor as claimed in claim 1 comprises:

a nitrogen container unit;

the compressor unit comprises at least one condenser, a first directional condenser valve, and a second directional condenser valve;

the first directional condenser valve and the second directional condenser valve being in fluid communication with the at least one condenser;

the first directional condenser valve being in fluid communication with a duel drum motor exit tube of the duel drum motor unit;

the first directional condenser valve being in fluid communication with a carousel carbon dioxide outlet of the carbon dioxide carousel motor unit; and the second directional condenser valve being in fluid communication with the nitrogen container unit.

* * * * *